US009680981B2

(12) United States Patent
Park et al.

(10) Patent No.: US 9,680,981 B2
(45) Date of Patent: Jun. 13, 2017

(54) HOME APPLIANCE AND CONTROL METHOD THEREOF

(71) Applicant: SAMSUNG ELECTRONICS CO., LTD., Suwon-si (KR)

(72) Inventors: Si Hyun Park, Suwon-si (KR); Talipov Elmurod, Suwon-si (KR); Dal Young Yu, Suwon-si (KR); Hoon Kim, Seoul (KR); Young Woon Kim, Suwon-si (KR); Jae Seok Lee, Incheon (KR); Jae Seung Choi, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 14/341,016

(22) Filed: Jul. 25, 2014

(65) Prior Publication Data
US 2015/0038103 A1 Feb. 5, 2015

(30) Foreign Application Priority Data

Jul. 30, 2013 (KR) .................. 10-2013-0090163
Dec. 10, 2013 (KR) .................. 10-2013-0152888

(51) Int. Cl.
*H04M 11/04* (2006.01)
*H04M 1/725* (2006.01)
*H04L 12/28* (2006.01)
*H04W 4/20* (2009.01)
*H04L 29/06* (2006.01)
(Continued)

(52) U.S. Cl.
CPC ...... *H04M 1/72533* (2013.01); *H04L 12/282* (2013.01); *H04L 12/2834* (2013.01); *H04L 63/08* (2013.01); *H04W 4/20* (2013.01); *H04L 63/0492* (2013.01); *H04L 63/18* (2013.01); *H04L 2012/285* (2013.01); *H04L 2012/2841* (2013.01); *H04W 4/008* (2013.01); *H04W 4/22* (2013.01)

(58) Field of Classification Search
CPC ................................................. H04M 1/72533
See application file for complete search history.

(56) References Cited

U.S. PATENT DOCUMENTS

2004/0114734 A1 6/2004 Yoon et al.
2005/0171661 A1* 8/2005 Abdel-Malek ...... B61L 27/0094
701/31.4
(Continued)

OTHER PUBLICATIONS

International Search Report dated Nov. 6, 2014 issued in corresponding International Patent Application PCT/KR2014/006989.

*Primary Examiner* — Justin Lee
(74) *Attorney, Agent, or Firm* — Staas & Haley LLP

(57) ABSTRACT

A control method of a home appliance, the method including retrieving information about a communication device, authenticating the communication device, registering the authenticated communication device, receiving voice data from the registered communication device, outputting a voice signal corresponding to the received voice data to a user, receiving the voice signal from the user, and transmitting voice data corresponding to the received voice signal to the communication device. When the method is used, even if a user loses a communication device in a home, call is possible using a home appliance such as refrigerator.

24 Claims, 24 Drawing Sheets

(51) Int. Cl.
*H04W 4/00* (2009.01)
*H04W 4/22* (2009.01)

(56) References Cited

U.S. PATENT DOCUMENTS

| | | | |
|---|---|---|---|
| 2006/0252457 | A1 | 11/2006 | Schrager |
| 2007/0240200 | A1 | 10/2007 | Han |
| 2008/0254746 | A1* | 10/2008 | Krishnan ............ H04M 1/6091 455/66.1 |
| 2009/0051648 | A1* | 2/2009 | Shamaie ............... G06F 3/0346 345/156 |
| 2010/0040213 | A1 | 2/2010 | Park et al. |
| 2010/0185537 | A1* | 7/2010 | Bari ....................... G06Q 30/04 705/34 |
| 2010/0260328 | A1* | 10/2010 | Belt ......................... H04M 1/57 379/142.04 |
| 2012/0124656 | A1* | 5/2012 | Senac ................... H04L 9/3213 726/9 |
| 2012/0276891 | A1 | 11/2012 | Bai |
| 2013/0212204 | A1* | 8/2013 | Kearney, III ......... H04W 4/021 709/208 |
| 2014/0188463 | A1* | 7/2014 | Noh ....................... G10L 15/00 704/201 |
| 2014/0199972 | A1* | 7/2014 | Ejima ................... H04W 4/008 455/411 |
| 2014/0282937 | A1* | 9/2014 | Farber .................... H04L 63/08 726/6 |

* cited by examiner

HOME APPLIANCE AND CONTROL METHOD THEREOF

CROSS-REFERENCE TO RELATED APPLICATIONS

This application claims the priority benefit of Korean Patent Application Nos. 10-2013-0090163 filed on Jul. 30, 2013 and 10-2013-0152888 filed on Dec. 10, 2013, in the Korean Intellectual Property Office, the disclosures of which are incorporated herein by reference.

BACKGROUND

1. Field

The following description relates to a home appliance for performing voice communications in place of a communication device, and a control method of the home appliance.

2. Description of the Related Art

In general, a home appliance such as a refrigerator is positioned close to a user at home. For example, a refrigerator stores food, an air conditioner cools a space in which a user is positioned, and a television (TV) provides content to a user.

A communication device such as a mobile phone, a smartphone, and the like is positioned at a random location of a home appliance of the user.

In recent days, a home appliance such as a refrigerator and a communication device are connected to a wide area communication network through a device such as a repeater or a router and communication between a home appliance such as a refrigerator and a communication device is possible through such devices.

In general, a communication device is portable and has a small size to be easily carried by a user. Accordingly, because of the small size, the user may easily lose the communication device and is not capable of answering the phone while the communication device is not capable of being found.

SUMMARY

Therefore, it is an aspect of the present disclosure to provide a home appliance and a method for controlling the same, for making a call using a home appliance such as a refrigerator in place of a communication device.

It is another aspect of the present disclosure to provide a voice communication system and a method of controlling the same, for recognizing a location of a lost communication device using a home appliance such as a refrigerator.

Additional aspects of the disclosure will be set forth in part in the description which follows and, in part, will be obvious from the description, or may be learned by practice of the disclosure.

In accordance with one aspect of the present disclosure, a control method of a home appliance includes retrieving information about a communication device, authenticating the communication device, registering the authenticated communication device, receiving voice data from the registered communication device, outputting a voice signal corresponding to the received voice data to a user, receiving the voice signal from the user, and transmitting voice data corresponding to the received voice signal to the communication device.

The method may further include ending communication with the communication device when a call device change command is input by the user.

The retrieving may include transmitting a communication device retrieval signal to the communication device through a local area communication network, and receiving a response signal and identification information of the communication device.

The authenticating may include generating an authentication code to authenticate the communication device, transmitting the authentication code to the communication device, receiving a code corresponding to the authentication code from the user, and authenticating the communication device according to a comparison result between the received code and the authentication code.

The authenticating may include receiving identification information from the communication device when the communication device is docked, and authenticating the communication device transmitting the identification information.

The authenticating may include authenticating the communication device transmitting identification information of the retrieved communication device when the identification information is input via near field communication.

The registering may include storing an identification code of the authenticated communication device.

The method may further include displaying identification information of a caller that transmits a call request when the call request is received from the communication device.

The identification information of the caller may include at least one of a name, a picture, and a telephone number of the caller.

The method may further include receiving identification information of a receiver that receives a call request when the user inputs the call request.

The identification information of the receiver may include at least one of a name and a telephone number of the receiver.

The method may further include transmitting a calling signal to the communication device when the user inputs a calling command for the registered communication device, and stopping transmitting the calling signal when a response signal to the calling signal is received.

In accordance with another aspect of the present disclosure, a home appliance includes a voice input unit to receive voice of a user, a sound output unit to output sound, a communication unit to transmit and receive voice data to and from a communication device, and a controller to control the sound output unit to output a sound signal corresponding to the voice data received from the authenticated communication device through the communication unit when the communication device is authenticated.

The controller may control the communication unit to transmit voice data corresponding to the voice signal received from the voice input unit to the authenticated communication device.

The controller may transmit a communication device retrieval signal to the communication device in order to retrieve the communication device and receives a response signal and identification information of the communication device.

The communication unit may include a wired communication module to wired-communicate with the communication device, a local area radio communication module to perform local area radio communication with the communication device, and a near field communication module to perform near field communication with the communication device.

The controller may transmit an authentication code to the communication device and authenticates the communication device according to a comparison result between a code input by the user and the authentication code.

The controller may receive identification information from the communication device when the communication device is docked and authenticates the docked communication device.

The controller may authenticate the communication device transmitting identification information upon receiving the identification information through the near field communication module.

The home appliance may further include a storage unit to store a program and data, wherein the controller may store identification information of the authenticated communication device in the storage unit.

According to an embodiment of the present specification, even if a user loses a communication device in a home, a call available voice communication system may make a call using a home appliance such as a refrigerator.

According to another embodiment of the present specification, when a user loses a communication device in a home, a location of the communication device may be easily recognized using a home appliance such as a refrigerator.

BRIEF DESCRIPTION OF THE DRAWINGS

These and/or other aspects of the disclosure will become apparent and more readily appreciated from the following description of an embodiment, taken in conjunction with the accompanying drawings of which.

DETAILED DESCRIPTION

Figure 1:
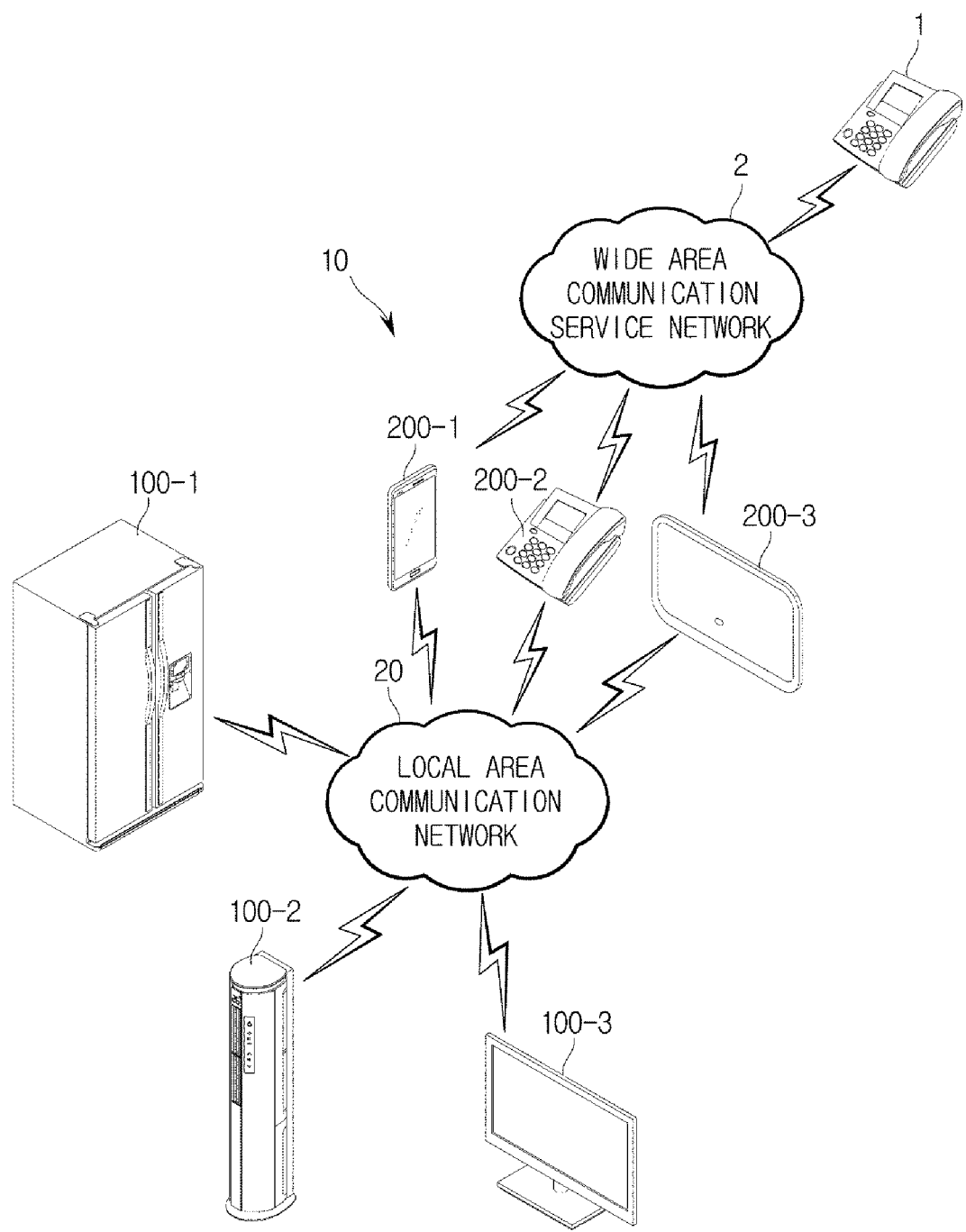
FIG. 1 is a conceptual diagram illustrating a voice communication system according to an embodiment of the present disclosure.

Reference will now be made in detail to an embodiment, examples of which are illustrated in the accompanying drawings, wherein like reference numerals refer to the like components throughout. An embodiment are described below to explain the present disclosure by referring to the figures.

It is to be appreciated that configurations in embodiments and drawings of the specification are purely exemplary and various modifications that may replace an embodiment and drawings of the specification may be made when the application is filed.

Hereinafter, a refrigerator and a voice communication system using the same will be described according to exemplary embodiments of the disclosure with reference to the attached drawings.

FIG. 1 is a conceptual diagram illustrating a voice communication system 10 according to an embodiment of the present disclosure.

Referring to FIG. 1, the voice communication system 10 according to an embodiment includes communication devices 200 such as a mobile phone 200-1, a telephone with an internet capability ("an internet phone") 200-2, a tablet personal computer (PC) 200-3, and the like, which perform a voice communication function, and home appliances 100 such as a refrigerator 100-1, an air conditioner 100-2, a television (TV) 100-3, and the like.

The home appliances 100 and the communication devices 200 communicate with each other using a local area communication network 20 and the communication devices 200 and an external phone 1 communicate with each other using a wide area communication service network 2.

The local area communication network 20 refers to a network formed by the home appliances 100 and the communication devices 200 in the home or company and may be formed around a repeater (access point (AP)) for repeating communication between the home appliances 100 and the communication devices 200 or may be formed for separate communication between the home appliances 100 and the communication devices 200.

Mainly, the local area communication network 20 transmits and receives data via packet switching as a wide area communication scheme. The packet switching is a method of transmitting and receiving via a communication network, in which data is divided into small units that are called packets and the packets are transmitted via a communication network.

The wide area communication service network 2 refers to a communication network provided by a communication or network service provider that provides a voice communication service and may be formed by a repeater between the communication devices 200 and the external phone 1.

Wide area communication refers to data transmitting for transmitting data mainly via circuit switching. The circuit switching is a kind of methods of transmitting and receiving data via a communication network, in which a transmitter and a receiver match with each other in a single communication line on a communication network and data is transmitted through the matched communication line.

The communication devices 200 may voice-communicate with an external phone 1 through the wide area communication service network 2 and may also communicate with the home appliances 100 through the local area communication network 20.

The home appliances 100 including the refrigerator 100-1, the air conditioner 100-2, the TV 100-3, and the like may perform the respective unique operations and may also communicate with the communication devices 200 through the local area communication network 20.

A user may talk to another user through the home appliances 100 as well as the communication devices 200. In other words, the communication devices 200 may transmit voice data, received from the external phone 1 through the wide area communication service network 2, to the home appliances 100 through the local area communication network 20, and the home appliances 100 may convert voice data received through the local area communication network 20 into a voice signal and output the voice signal. In addition, the home appliances 100 may convert a voice signal received from the user into voice data and then transmit the converted voice data to the communication devices 200 through the local area communication network 20, and the communication devices 200 may transmit the voice data received from the home appliances 100 to the external phone 1 through the wide area communication service network 2.

Hereinafter, the communication devices 200 and the home appliances 100 included in the voice communication system 10 will be described.

Figure 2:
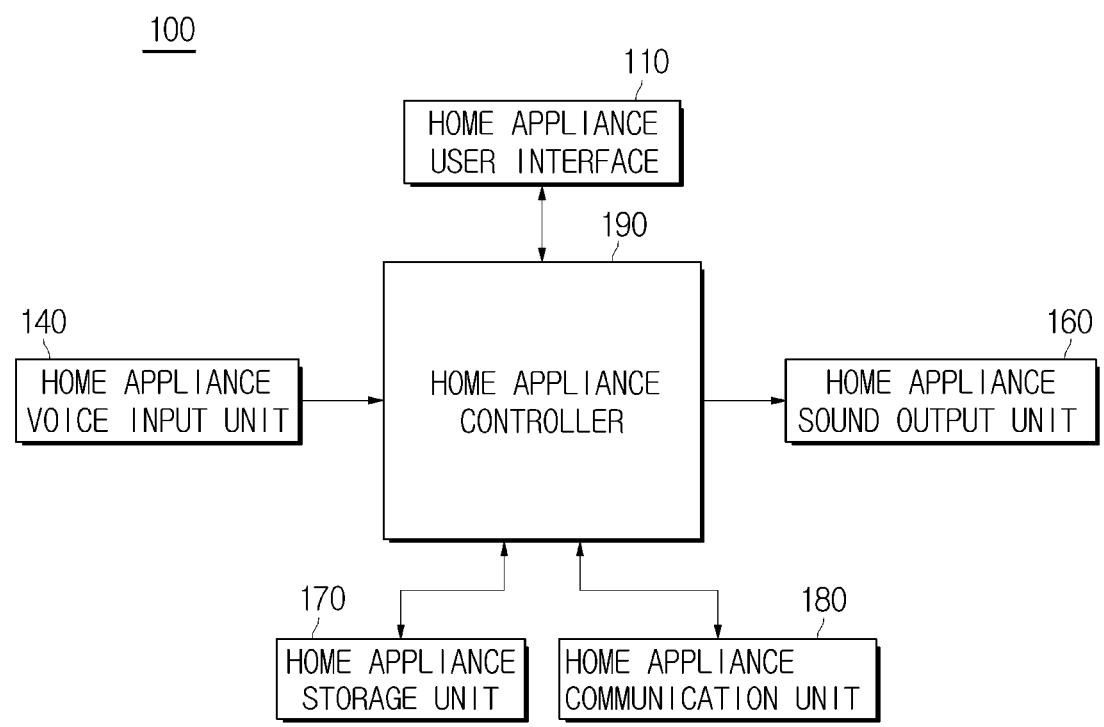
FIG. 2 is a block diagram illustrating a structure of a home appliance according to an embodiment of the present disclosure.
Figure 3:
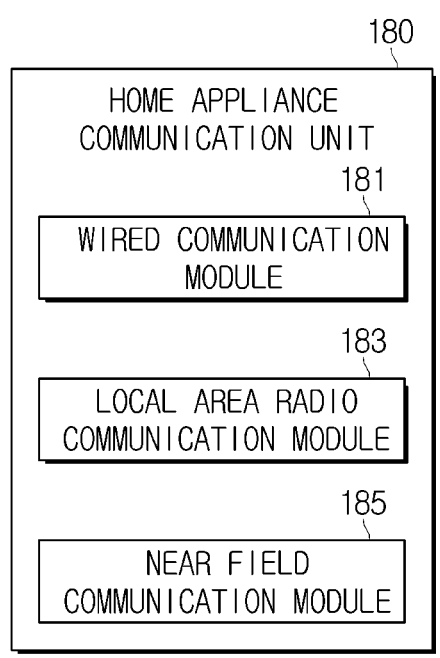
FIG. 3 is a block diagram illustrating a structure of a home appliance communication unit included in a home appliance according to an embodiment of the present disclosure.

FIG. 2 is a block diagram illustrating a structure of a home appliance 100 according to an embodiment of the present disclosure. FIG. 3 is a block diagram illustrating a structure of a home appliance communication unit 180 included in a home appliance according to an embodiment of the present disclosure.

The structure of the home appliance 100 will now be described with reference to FIGS. 2 and 3. The home appliance 100 includes a home appliance user interface 110 to receive a control command from the user and to display operation information of the home appliance 100, a home appliance voice input unit 140 to receive voice of the user, a home appliance sound output unit 160 to output voice, a home appliance storage unit 170 to store a program and data related to an operation of the home appliance 100, the home appliance communication unit 180 to communicate with an external device such as the communication device 200 (refer to FIG. 1), and a home appliance controller 190 to control the operation of the home appliance 100.

The home appliance user interface 110 may include a push button, a membrane button, a touchpad, or the like, which receives the control command of the user, and a display panel to display the operation information of the home appliance 100. In addition, the display panel may employ, for example, a liquid crystal display (LCD) panel, a light emitting diode (LED) panel, an organic light emitting diode (OLED) panel, or the like.

In particular, the home appliance user interface 110 may include a touch screen panel (TSP) formed by integrating a touchpad to detect user contact and a display panel to display operation information to the user.

The TSP displays a control command via the display panel, determines coordinates of a region, which is touched by the user and corresponds to the control command, and compares the coordinates of the region with coordinates of the displayed control command to recognize the control command input by the user.

However, the home appliance user interface 110 is not limited to a TSP.

The home appliance voice input unit 140 may include a microphone (not shown) that converts a voice signal of the user into an electrical signal and provides the electrical signal to the home appliance controller 190 and may further include an amplifier (not shown) that amplifies the electrical signal output by the microphone (not shown).

The home appliance sound output unit 160 may include a speaker (not shown) to convert the electrical signal provided by the home appliance controller 190 into a voice signal and may further include an amplifier (not shown) that amplifies the electrical signal output by the home appliance controller 190.

The home appliance storage unit 170 may include a non-volatile memory (not shown) to permanently store a program and data for control of the operation of the home appliance 100, for example, a magnetic disk, a solid state disk, and the like, and a volatile memory (not shown) to temporarily stores data generated during the operation of the home appliance 100, for example, a D-RAM, an S-RAM, and the like.

The home appliance communication unit 180 may include a wired communication module 181 that wired-communicates with the communication device 200 (refer to FIG. 1) through a connector (not shown) when the communication device 200 (refer to FIG. 1) is mounted, a local area radio communication module 183 that accesses the local area communication network 20 (refer to FIG. 1) using a local radio communication scheme such as wireless fidelity (Wi-Fi), Bluetooth, ZigBee, or the like, and a near field communication module 185 that performs near field radio communication within about 10 cm, such as near field communication (NFC) or the like.

The home appliance controller 190 may include one or more general-purpose processors that perform an arithmetic operation according to a program and data stored in the home appliance storage unit 170.

An operation of the home appliance controller 190 will now be described briefly. The home appliance controller 190 may control the home appliance sound output unit 160 to convert voice data received from the communication device 200 (refer to FIG. 1) through the home appliance communication unit 180 into a voice signal and to output the converted voice signal and control the home appliance communication unit 180 to convert the voice signal input through the home appliance voice input unit 140 into voice data and to transmit the converted voice data to the communication device 200 (refer to FIG. 1).

Figure 4:
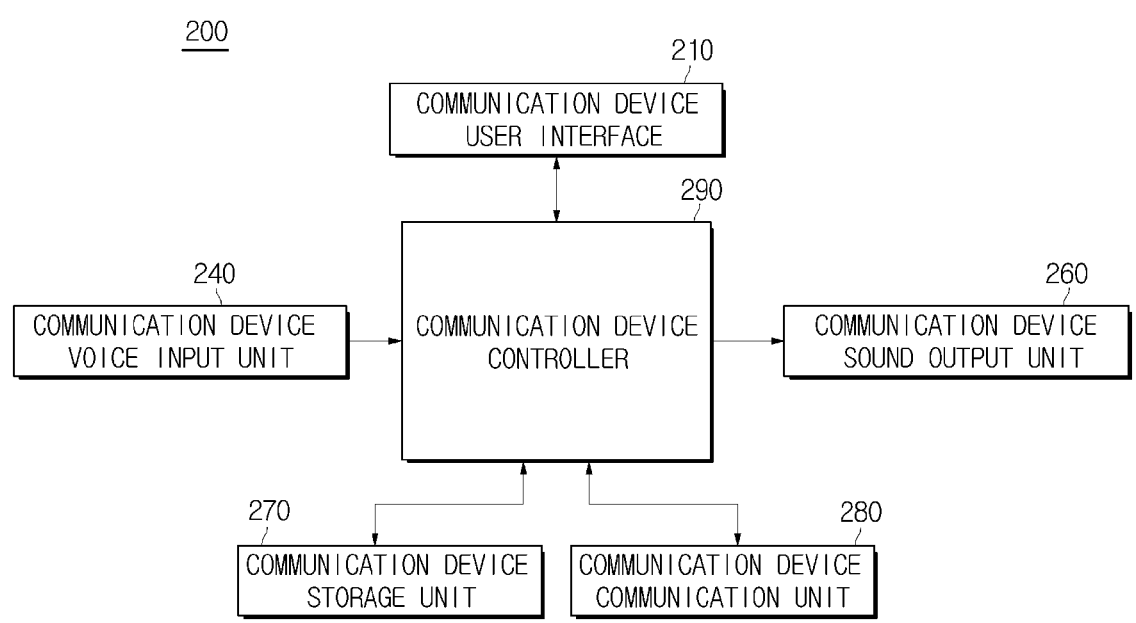
FIG. 4 is a block diagram illustrating a control configuration of a communication device according to an embodiment of the present disclosure.
Figure 5:
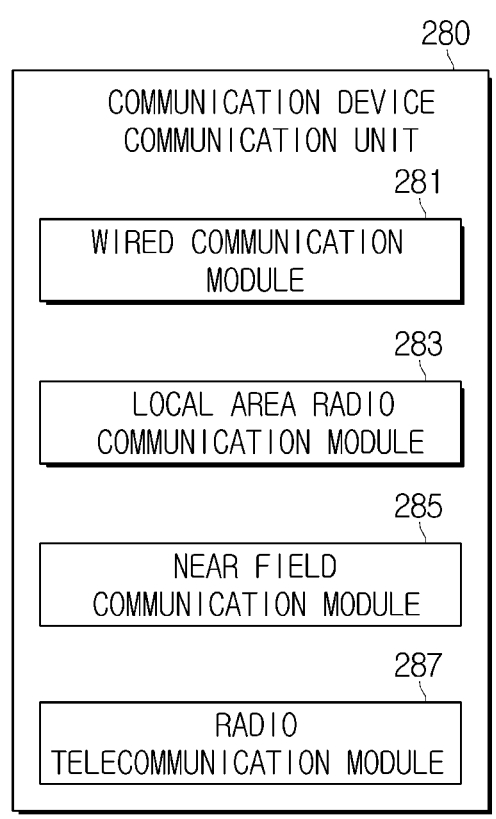
FIG. 5 is a block diagram illustrating a structure of a communication device communication unit included in a communication device according to an embodiment of the present disclosure.

FIG. 4 is a block diagram illustrating a control configuration of a communication device 200 according to an embodiment of the present disclosure. FIG. 5 is a block diagram illustrating a structure of a communication device communication unit 280 included in the communication device 200 according to an embodiment of the present disclosure.

A structure of the communication device 200 will now be described with reference to FIGS. 4 and 5. The communication device 200 includes a communication device user interface 210 to receive a control command from a user and to display operation information of the communication device 200, a communication device voice input unit 240 to receive voice of the user, a communication device sound output unit 260 to output voice, a communication device storage unit 270 to store a program and data related to an operation of the communication device 200, the communication device communication unit 280 that communicates with the home appliance (refer to FIG. 1), the external phone 1, and the like, and a communication device controller 290 to control the operation of the communication device 200.

The communication device user interface 210 may include a push button, a membrane button, a touchpad, or the like, which receives the control command of the user, and a display panel to display the operation information of the communication device 200. In addition, the display panel may employ a liquid crystal display (LCD) panel, a light emitting diode (LED) panel, an organic light emitting diode (OLED) panel, or the like.

In particular, the communication device user interface 210 may include a touch screen panel (TSP) formed by integrating a touchpad to detect user contact and a display panel to display operation information to the user.

However, the communication device user interface 210 is not limited to a TSP.

The communication device voice input unit 240 may include a microphone (not shown) that converts a voice signal of the user into an electrical signal and provides the electrical signal to the communication device controller 290.

The communication device sound output unit 260 may include a speaker (not shown) to convert the electrical signal provided by the communication device controller 290 into a voice signal.

The communication device storage unit 270 may include a non-volatile memory (not shown) to permanently store a program and data for control of the operation of the communication device 200, for example, a magnetic disk, a solid state disk, and the like, and a volatile memory (not shown) to temporarily stores data generated during the operation of the home appliance 100, for example, D-RAM, S-RAM, and the like.

The communication device communication unit 280 includes a wired communication module 281 that wired-communicates with the communication device 200 (refer to FIG. 1) upon being mounted on the home appliance 100 (refer to FIG. 1), a local area radio communication module 283 that accesses the local area communication network 20 (refer to FIG. 1), a near field communication module 285 that performs non-contact communication within a distance of about 10 cm, and a radio telecommunication module 287 that accesses the wide area communication service network 2 (refer to FIG. 1).

The local area radio communication module 283 may use a local area radio communication scheme such as wireless fidelity (Wi-Fi), Bluetooth, ZigBee, or the like, and the near field communication module 285 may use a near field radio communication scheme such as near field communication (NFC) or the like. Here, NFC is a near field communication scheme for radio communication within a very short distance of several cm to several tens of cm and having a communication band of about 13.56 MHz.

In addition, the radio telecommunication module 287 may use a wide area radio communication scheme such as time division multiple access (TDMA), code division multiple access (CDMA), wideband code division multiple access (WCDMA), wireless broadband (WiBro), world interoperability for microwave access (WiMAX), long term evolution (LTE), and the like.

The communication device controller 290 may include one or more general-purpose processors that perform an arithmetic operation according to a program and data stored in the communication device storage unit 270.

An operation of the communication device controller 290 will now be briefly described. The communication device controller 290 may control the communication device sound output unit 260 to convert the voice data received through the communication device communication unit 280 into a voice signal and to output the converted voice signal. In addition, the communication device controller 290 controls the communication device communication unit 280 to convert the voice signal input through the communication device voice input unit 240 into voice data and to transmit the converted voice data.

In addition, the communication device controller 290 may transmit the voice data received from the wide area communication service network 2 (refer to FIG. 1) through the radio telecommunication module 287 to the home appliance 100 (refer to FIG. 1) using the local area radio communication module 283 and transmit the voice data received from the home appliance 100 (refer to FIG. 1) through the local area radio communication module 283 to the wide area communication service network 2 (refer to FIG. 1) using the radio telecommunication module 287.

Hereinafter, an operation of a voice communication system will be described.

Referring back to FIG. 1, an operation of the voice communication system 10 will now be briefly described. The voice communication system 10 selects the home appliance 100 that performs a call function and the communication device 200 that will communicate with the home appliance 100. Then, upon receiving a call request, the communication device 200 may indicate that the call request is received through the home appliance 100, and may accept the call request according to a user command. In addition, the home appliance 100 may transmit the call request to the external phone 1 through the communication device 200 according to the user command.

First, selection of the home appliance 100 that performs a call function and the communication device 200 that will communicate with the home appliance 100 via the voice communication system 10 will be described.

Figure 6:
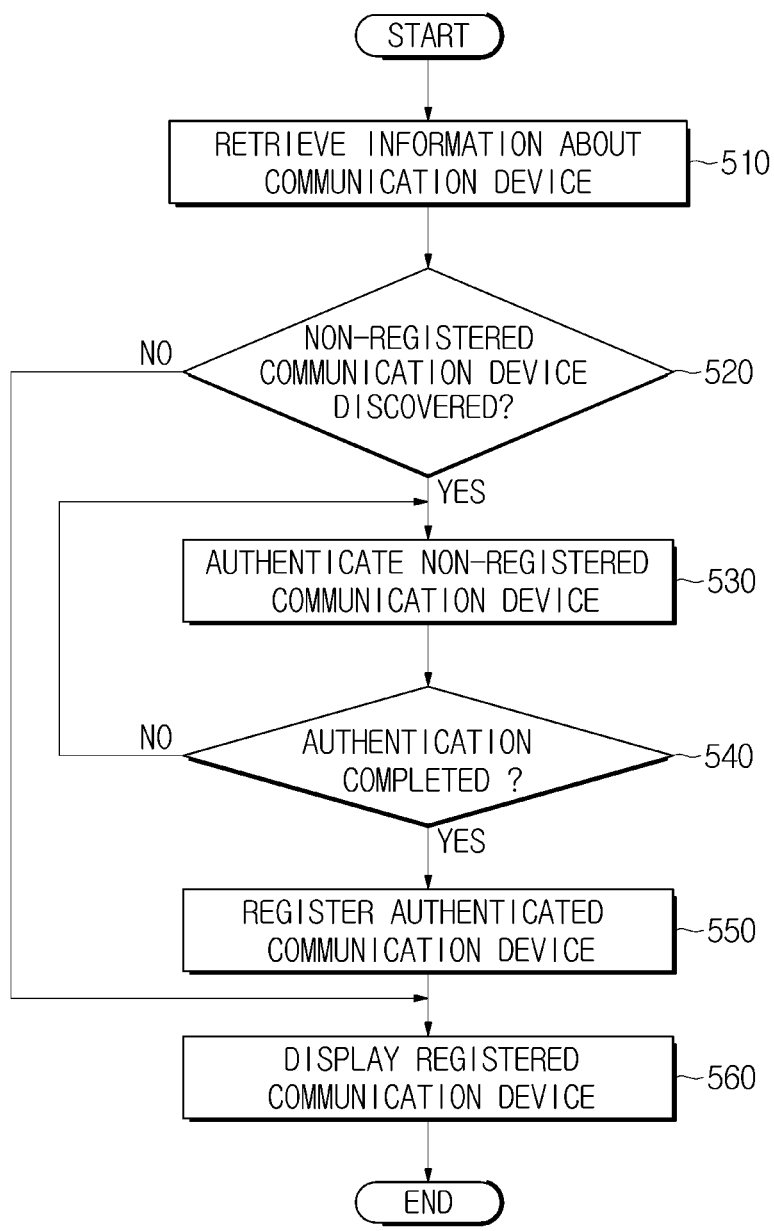
FIG. 6 is a flowchart illustrating a method of retrieving information about communication devices by a home appliance, according to an embodiment of the present disclosure.
Figure 7:
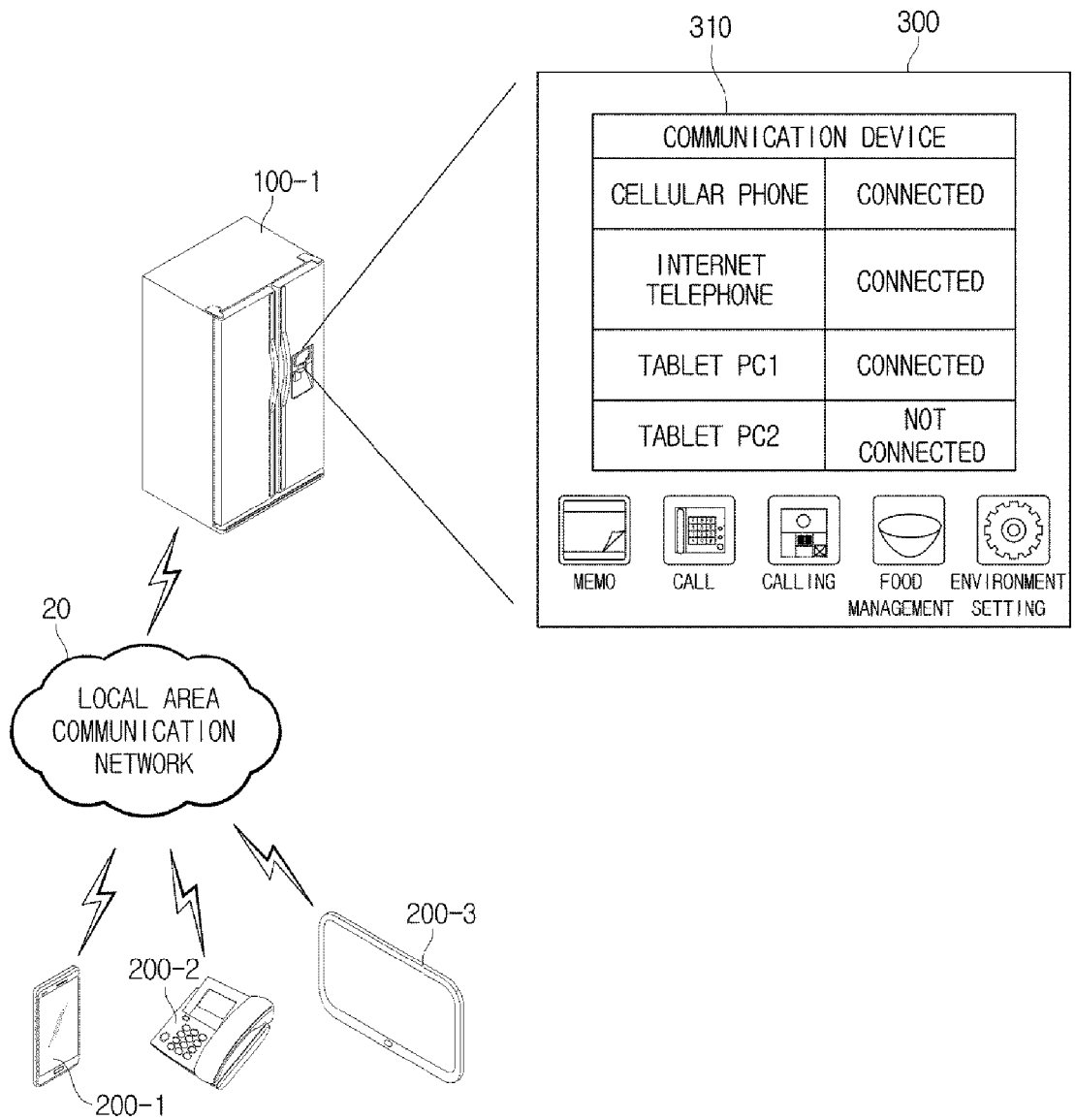
FIG. 7 is a diagram illustrating an example in which a home appliance retrieves information about communication devices, according to an embodiment of the present disclosure.

FIG. 6 is a flowchart illustrating a method of retrieving information about the communication devices 200 by the home appliance 100, according to an embodiment of the present disclosure. FIG. 7 is a diagram illustrating an example in which the home appliance 100 retrieves information about the communication devices 200, according to an embodiment of the present disclosure.

Referring to FIGS. 6 and 7, the home appliance 100 retrieves information about the communication devices 200 (510). In detail, the home appliance 100 may retrieve information about the communication devices 200 using a communication scheme such as Wi-Fi, Bluetooth, ZigBee, or the like.

For example, as illustrated in FIG. 7, the home appliance 100 transmits a communication device retrieval signal to the mobile phone 200-1, the Internet telephone 200-2, the tablet PC 200-3, or the like through the local area communication network 20.

The communication device 200 that receives the communication device retrieval signal transmits identification information such as an identification code such as a MAC address, an Internet protocol (IP) address, and the like together with a response signal. The home appliance 100 may identify the communication device 200 using the identification information.

Then, the home appliance 100 determines whether information about a non-registered communication device is retrieved (520). In detail, the home appliance 100 determines whether information about communication devices other than that of a registered communication device are retrieved, and an authentication procedure will be performed for the non-registered communication device that will be described below.

When information about the non-registered communication device is retrieved (Yes of 520), the home appliance 100 authenticates the non-registered communication device (530). This is because information about communication devices of other people may be retrieved when information about communication devices are retrieved via radio communication, and in this case, a user may receive signals of telephones of other people.

Then, the home appliance 100 determines whether authentication is completed (540). When the authentication is completed (Yes of 540), the home appliance 100 registers an authenticated communication device (550).

An authentication procedure will be described below in detail.

When information about the non-registered communication device is not retrieved (No of 520) or is registered, the home appliance 100 displays a list of registered communication devices to the user (560).

For example, as illustrated in FIG. 7, when information about the mobile phone 200-1, the Internet telephone 200-2, and a tablet computer 1 200-3 are retrieved as registered communication devices and a tablet PC 2 is registered but its information is not currently retrieved, the home appliance 100 may display a communication device retrieving result image 310 indicating that the mobile phone 200-1, the Internet telephone 200-2, and the tablet PC 1 200-3 are connected and the tablet PC 2 is not connected, as illustrated in FIG. 6.

Figure 8:
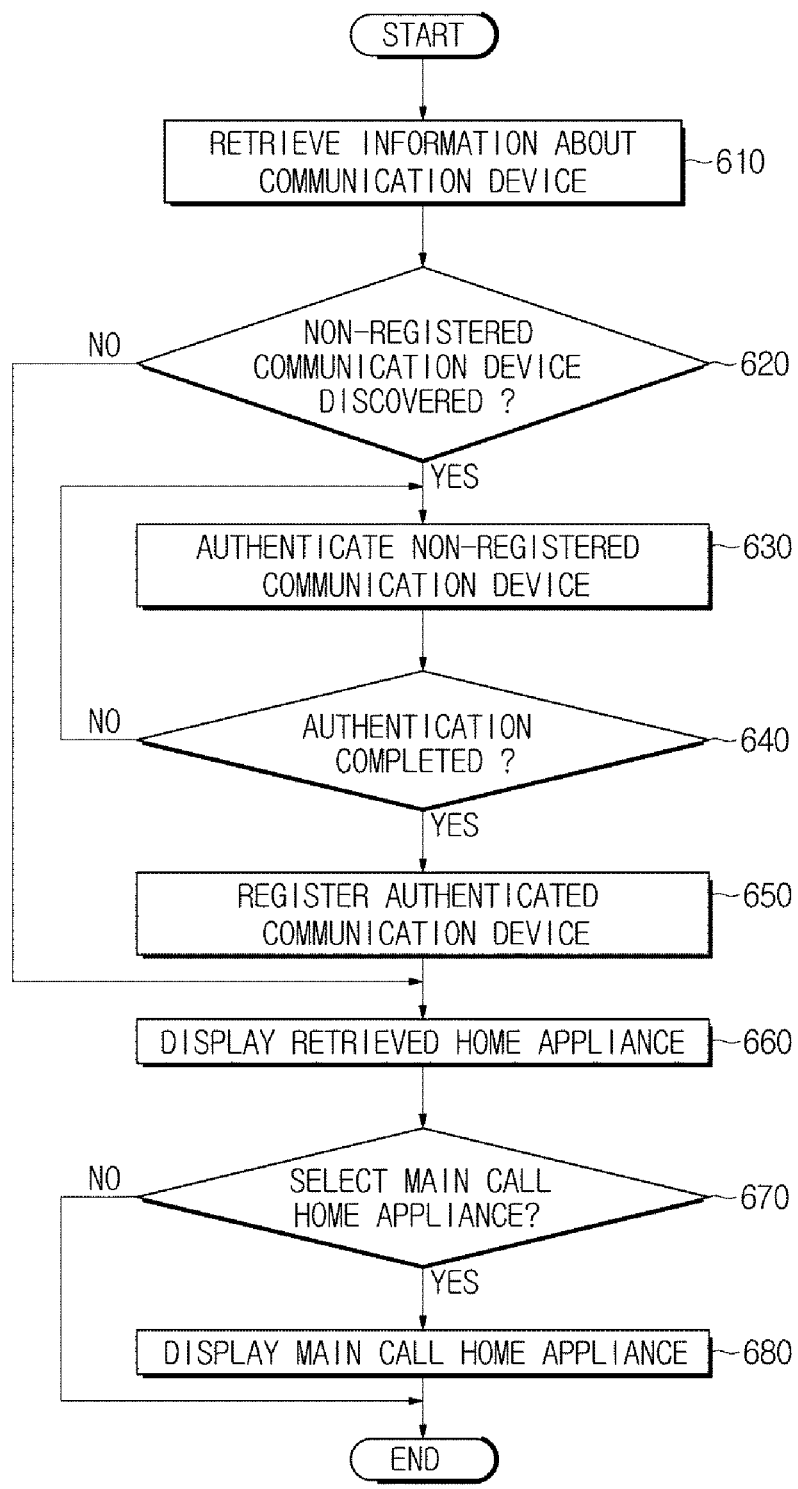
FIG. 8 is a flowchart illustrating a method of retrieving information about a call capable home appliance by a communication device according to an embodiment of the present disclosure.
Figure 9:
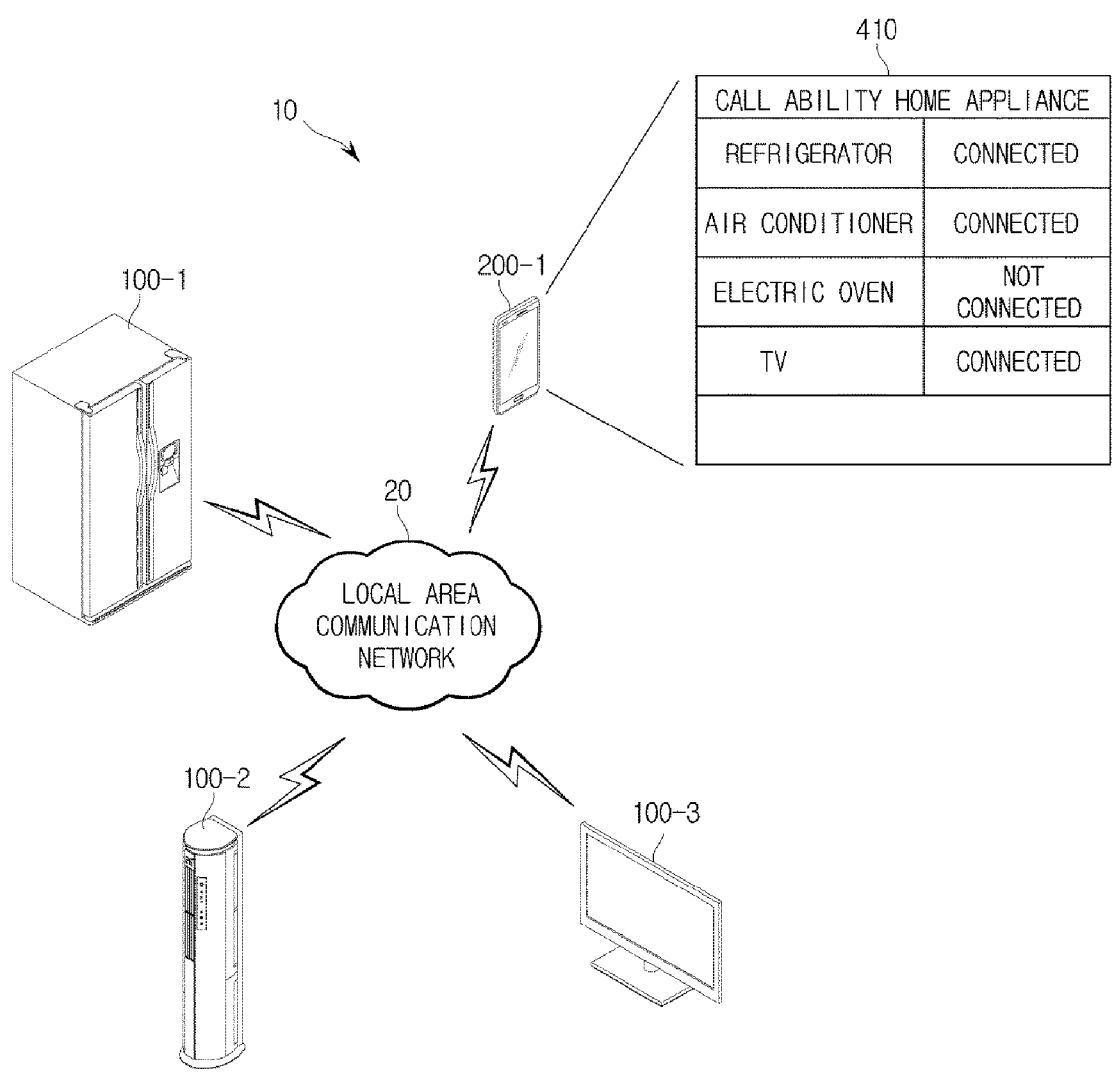
FIG. 9 is a diagram illustrating an example in which a communication device retrieves information about a call capable home appliance, according to an embodiment of the present disclosure.

FIG. 8 is a flowchart illustrating a method of retrieving information about a call capable home appliance by a communication device according to an embodiment of the present disclosure. FIG. 9 is a diagram illustrating an example in which a communication device retrieves information about the call capable home appliance, according to an embodiment of the present disclosure.

Referring to FIGS. 8 and 9, the communication device 200 retrieves information about the home appliances 100 (610). In detail, the communication device 200 may retrieve information about a call capable home appliance using a communication scheme such as Wi-Fi, Bluetooth, ZigBee, or the like. For example, as illustrated in FIG. 9, the communication device 200 transmits a home appliance retrieval signal to the refrigerator 100-1, the air conditioner 100-2, the TV 100-3, or the like through the local area communication network 20.

The home appliance 100 that receives the home appliance retrieval signal transmits identification information such as an identification code such as a MAC address, an Internet protocol (IP) address, and the like together with a response signal. The communication device 200 may identify the home appliance 100 using the identification information transmitted from the home appliance 100.

Then, the communication device 200 determines whether information about a non-registered home appliance is retrieved (620). In detail, the communication device 200 determines whether information about home appliances other than that of a registered home appliance are retrieved via an authentication procedure that will be described below.

When information about the non-registered home appliance is retrieved (Yes of 620), the communication device 200 authenticates the non-registered home appliance (630). This is because information about home appliances of other people may be retrieved when information about home appliances are retrieved via radio communication, in which case other people may receive a signal of a telephone of the user.

Then, the communication device 200 determines whether authentication is completed (640). When the authentication is completed (Yes of 640), the communication device 200 registers an authenticated home appliance (650).

An authentication procedure will be described below in detail.

When information about the non-registered home appliance is not retrieved (No of 620) or is registered, the communication device 200 displays a list of registered home appliances to the user (660).

For example, information about the refrigerator 100-1, the air conditioner 100-2, and the TV 100-3 are retrieved and information about an electric oven is registered but is not currently retrieved, the communication device 200 may display a home appliance retrieving result image 410 indicating that the refrigerator 100-1, the air conditioner 100-2, and the TV 100-3 are connected and the electric oven is not connected, as illustrated in FIG. 9.

Then, the communication device 200 determines whether a home appliance selection command is input by the user (670). The user may select any one of a plurality of home appliances as a main call home appliance and make a call using the selected main call home appliance. In addition, the user may not select the main call home appliance and make a call using at least one of the retrieved home appliances.

When the user selects the main call home appliance (YES of 670), the communication device 200 displays the main call home appliance (680).

Hereinafter, an authentication procedure will be described.

Figure 10:
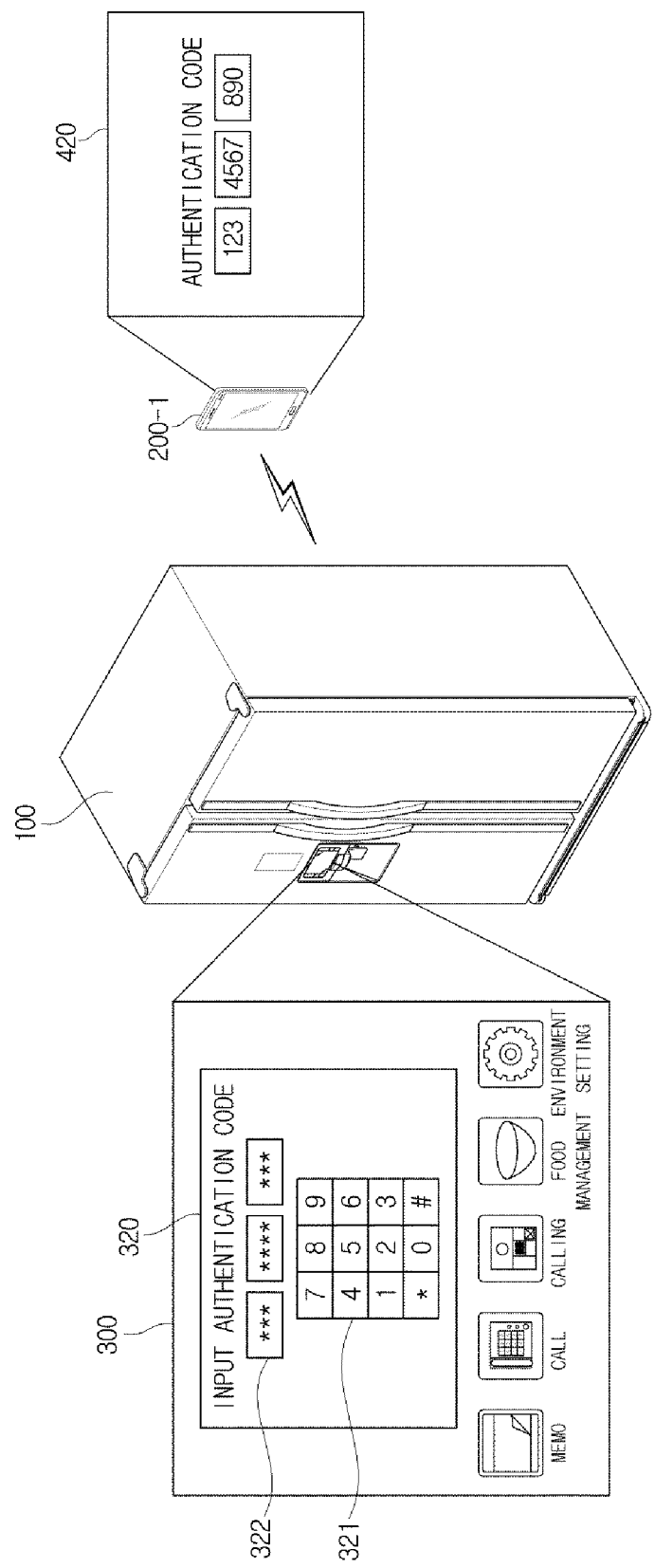
FIG. 10 is a diagram illustrating an example in which a home appliance authenticates a communication device via radio communication, according to an embodiment of the present disclosure.

FIG. 10 is a diagram illustrating an example in which the home appliance 100 authenticates the communication device 200 via radio communication, according to an embodiment of the present disclosure.

When the home appliance 100 transmits an authentication request to the communication device 200, the home appliance 100 generates authentication information such as an authentication code or number and transmits the generated authentication information to the communication device 200, and the communication device 200 displays the received authentication information to a user. When the user inputs the authentication information displayed on the communication device 200 to the home appliance 100, the authentication is completed.

For example, when the refrigerator 100-1 transmits an authentication request to the mobile phone 200-1, the refrigerator 100-1 may generate authentication information such as an authentication code or number and transmit the generated authentication information to the mobile phone 200-1.

As illustrated in FIG. 10, for example, the mobile phone 200-1 that receives the authentication code may display a first authentication code display image 420 indicating a received authentication code, and the home appliance 100 that transmits the authentication request may display a first authentication code input image 320 to receive the authentication code.

As illustrated in FIG. 10, the first authentication code input image 320 may include a keypad region 321 to receive the authentication code from the user and an input code display region 322 to display the authentication code input by the user.

When the authentication code is input to the refrigerator 100-1, the refrigerator 100-1 may compare the input authentication code and the generated authentication code.

In this case, when the input authentication code is equal to or same as the generated authentication code, the refrigerator 100-1 may register the mobile phone 200-1 as a communication device. When the input authentication code is not equal to or not same as the generated authentication code, the refrigerator 100-1 may warn the user that an incorrect authentication code has been input.

According to an embodiment, the home appliance 100 that transmits the authentication request generates the authentication code and transmits the generated authentication code to the communication device 200, the communication device 200 displays the authentication code, and the home appliance 100 receives the authentication code, but embodiments of the present disclosure are not limited thereto.

In other words, when the home appliance 100 that generates the authentication code, displays the authentication code and transmits the authentication code and the authentication request to the communication device 200, the communication device 200 may receive an authentication code from the user and transmit information indicating whether the home appliance 100 is authenticated to the home appliance 100.

Figure 11:
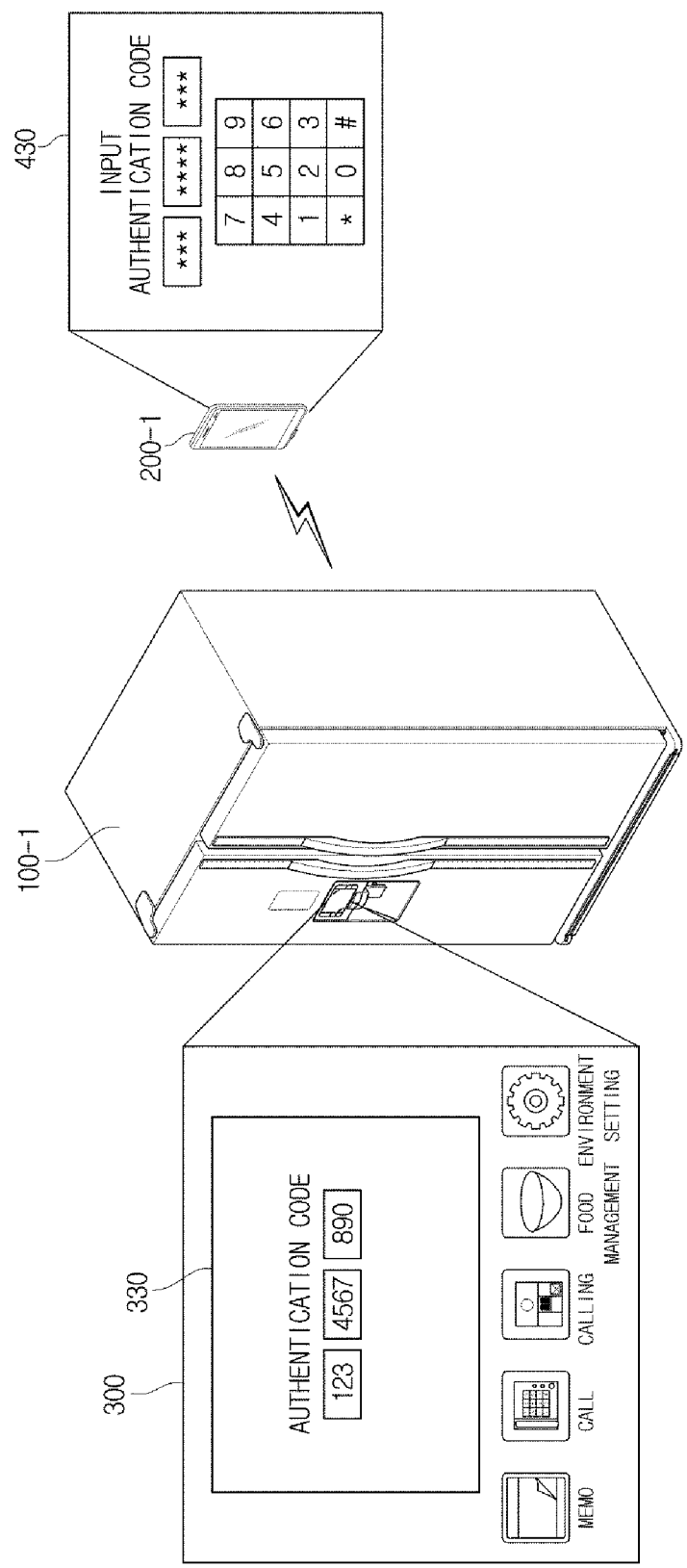
FIG. 11 is a diagram illustrating an example in which a communication device authenticates a home appliance 100 via radio communication, according to an embodiment of the present disclosure.

FIG. 11 is a diagram illustrating an example in which the communication device 200 authenticates the home appliance 100 via radio communication, according to an embodiment of the present disclosure.

When the communication device 200 transmits an authentication request to the home appliance 100, the communication device 200 generates an authentication information such as an authentication code or number and transmits the generated authentication information to the home appliance 100, and the home appliance 100 displays the received authentication information to the user. When the user inputs the authentication information displayed on the home appliance 100 to the communication device 200, the authentication is completed.

For example, when the mobile phone 200-1 transmits an authentication request to the refrigerator 100-1, the mobile phone 200-1 may generate an authentication information such an authentication code or number and transmit the generated authentication information to the refrigerator 100-1.

As illustrated in FIG. 11, the refrigerator 100-1 that receives the authentication information may display a second authentication code display image 330 indicating a received authentication code, and the mobile phone 200-1 that transmits the authentication request may display a second authentication code input image 430 to receive the authentication code.

When the authentication code is input to the mobile phone 200-1, the mobile phone 200-1 compares the input authentication code and the generated authentication code.

In this case, when the input authentication code is equal to or same as the generated authentication code, the mobile phone 200-1 may register the refrigerator 100-1 as a home appliance. When the input authentication code is not equal to or not same as the generated authentication code, the mobile phone 200-1 may warn the user that an incorrect authentication code has been input.

According to an embodiment, the communication device 200 that transmits the authentication request receives the authentication code, and the home appliance 100 that receives the authentication request displays the authentication code, but embodiments of the present disclosure are not limited thereto.

In other words, when the communication device 200 that generates the authentication code displays the authentication code and transmits the authentication code and the authentication request to the home appliance 100, the home appliance 100 may receive the authentication code from the user and transmit information indicating whether the communication device 200 is authenticated to the communication device 200.

Figure 12:
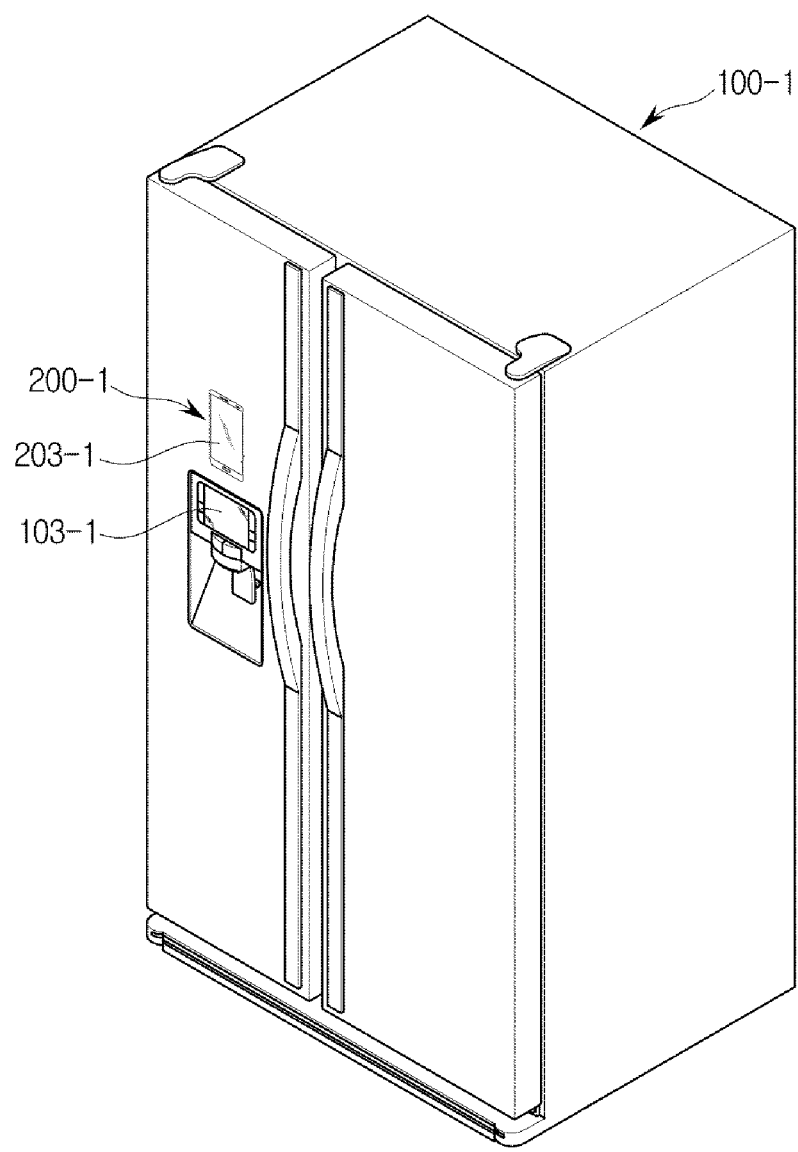
FIG. 12 is a diagram illustrating a case in which a communication device is docked to a home appliance and authenticates the home appliance, according to an embodiment of the present disclosure.

FIG. 12 is a diagram illustrating a case in which a communication device is docked to a home appliance and authenticates the home appliance, according to an embodiment of the present disclosure.

For example, as illustrated in FIG. 12, when the mobile phone 200-1 is docked to the refrigerator 100-1, the mobile phone 200-1 may automatically authenticate the refrigerator 100-1 as a home appliance, and the refrigerator 100-1 may also automatically authenticate the mobile phone 200-1 as a communication device. In other words, a user may authenticate the mobile phone 200-1 and the refrigerator 100-1 without the aforementioned authentication procedure of inputting the authentication code.

In detail, the refrigerator 100-1 may transmit identification information to the mobile phone 200-1 through the wired communication module 181 (refer to FIG. 3) and the mobile phone 200-1 may transmit identification information to the refrigerator 100-1 through the wired communication module 281 (refer to FIG. 5).

When the mobile phone 200-1 is docked to the refrigerator 100-1, it is apparent that the user may intend to receive calls via the docked mobile phone 200-1 through the refrigerator 100-1 and thus, a separate authentication procedure is not performed. However, authentication may still required if the mobile phone which is docked is unauthorized phone or unknown phone.

Even if the mobile phone 200-1 is docked to the refrigerator 100-1, the user may make a call using other home appliances other than the refrigerator 100-1 according to his or her selection.

When the mobile phone 200-1 is docked to the refrigerator 100-1, a touch screen panel 103-1 of the refrigerator 100-1 may display an image displayed on a touch screen panel 203-1 of the mobile phone 200-1, and the user may input a control command to the mobile phone 200-1 through the touch screen panel 103-1 of the refrigerator 100-1.

In addition, the refrigerator 100-1 may transmit food information stored in the refrigerator 100-1 and operation information of the refrigerator 100-1 to the mobile phone 200-1.

Figure 13:
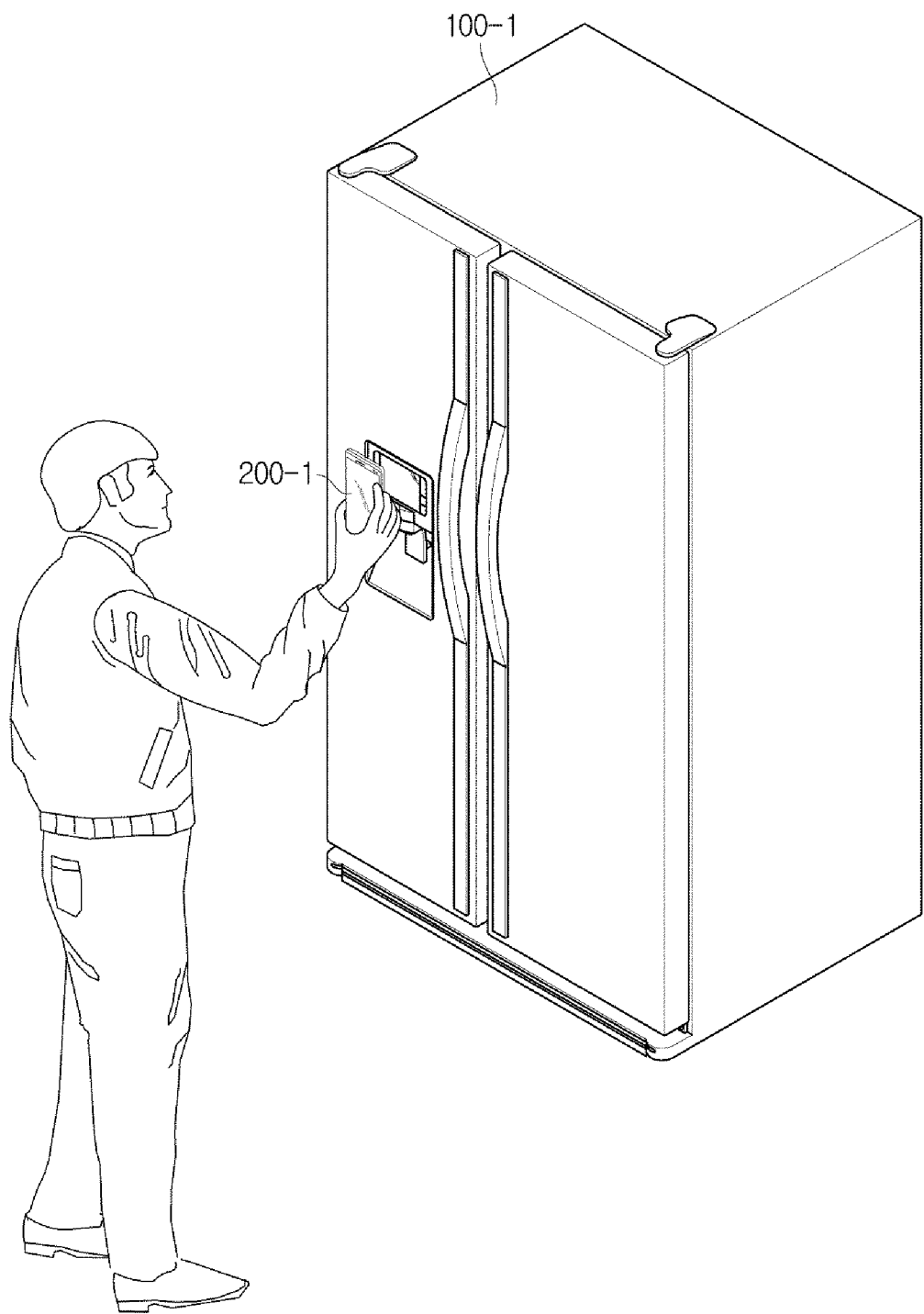
FIG. 13 is a diagram illustrating a case in which a communication device is moved close to a home appliance and authenticates a home appliance, according to an embodiment of the present disclosure.

FIG. 13 is a diagram illustrating a case in which a communication device is moved close to a home appliance and authenticates the home appliance, according to an embodiment of the present disclosure.

For example, as illustrated in FIG. 13, when the mobile phone 200-1 is moved close to the refrigerator 100-1, the mobile phone 200-1 automatically authenticates the refrigerator 100-1 as a home appliance and the refrigerator 100-1 also automatically authenticates the mobile phone 200-1 as a communication device. In other words, the user may authenticate the mobile phone 200-1 and the refrigerator 100-1 by moving the mobile phone 200-1 close to the refrigerator 100-1 without the aforementioned authentication procedure of inputting the authentication code.

In detail, the home appliance 100 may transmit identification information to the communication device 200 through the near field communication module 185 (refer to FIG. 3) or the communication device 200 may transmit identification information to the home appliance 100 through the near field communication module 285 (refer to FIG. 5).

Even if the communication device 200 is not docked directly to the home appliance 100, when the communication device 200 is moved close to the home appliance 100, it is apparent that the user intends to receive calls via the communication device 200 through the home appliance 100 and thus, a separate authentication procedure is not performed.

Hereinafter, call via a home appliance will be described. However, to aid in understating, a home appliance that performs a call function is assumed to be a refrigerator and a communication device is assumed to be a mobile phone.

Figure 14:
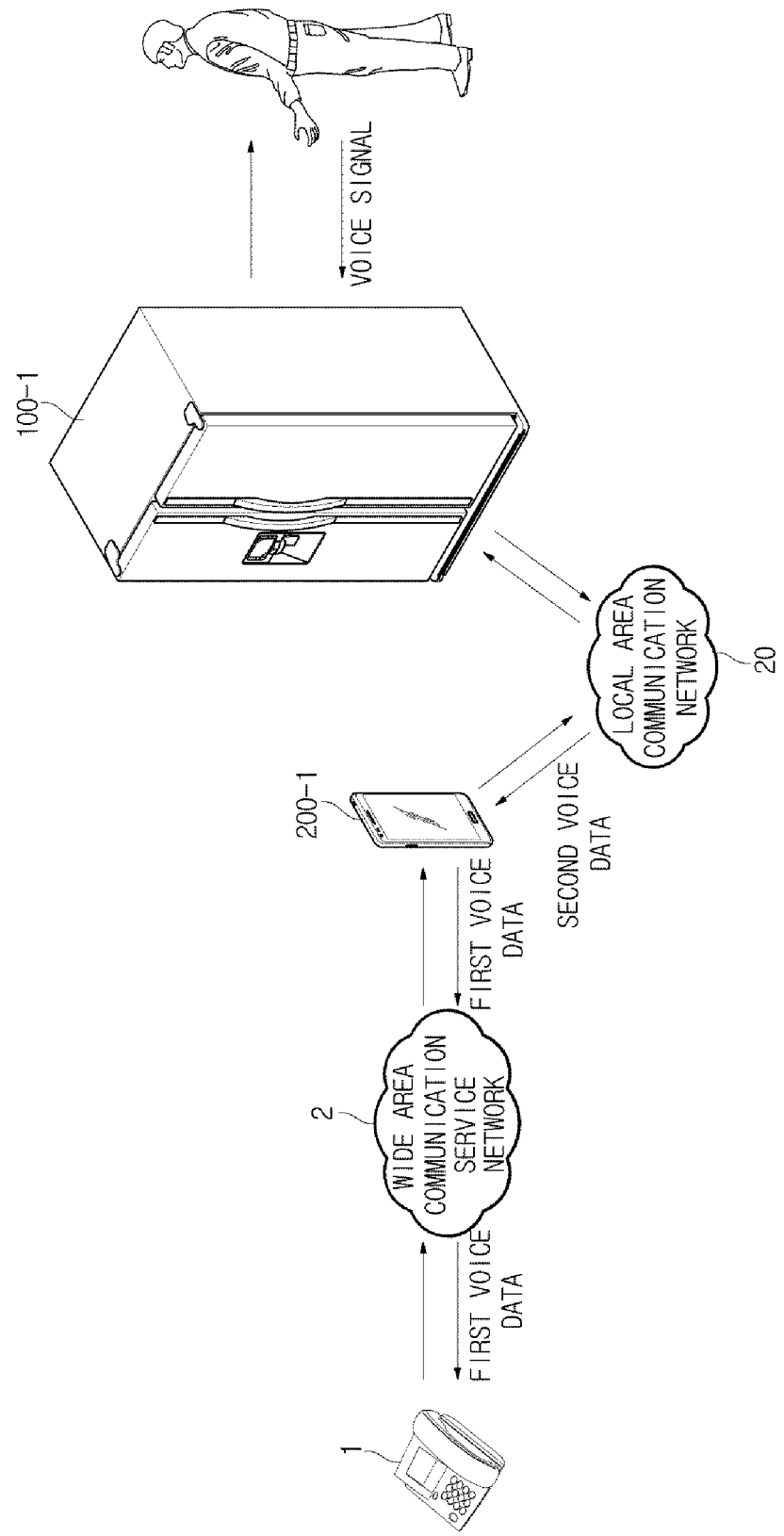
FIG. 14 is a diagram illustrating an example in which a home appliance and a communication device communicate with each other, according to an embodiment of the present disclosure.

FIG. 14 is a diagram illustrating an example in which a home appliance and a communication device communicate with each other, according to an embodiment of the present disclosure.

As illustrated in FIG. 14, the external phone 1 and the communication device 200 transmit and receive first voice data through the wide area communication service network 2.

The first voice data is converted into an analog signal by a modulator-demodulator (modem) and transmitted in a data form appropriate for data transmission and reception via circuit switching such as wideband code division multiple access (WCDMA), wireless broadband Internet (WiBro), or the like.

The communication device 200 may transmit and receive the first voice data through the radio telecommunication module 287.

When the voice communication system 10 according to an embodiment of the present disclosure is not used, the communication device 200 may convert the first voice data into a voice signal recognizable by a user U and output the voice signal to the user U.

When the voice communication system 10 according to an embodiment of the present disclosure is used, the communication device 200 converts the first voice data received from the wide area communication service network 2 into second voice data and transmits the second voice data to the home appliance 100 through the local area communication network 20. In other words, as illustrated in FIG. 14, the communication device 200 and the home appliance 100 transmit and receive the second voice data through the local area communication network 20.

The second voice data is divided into packet units, is converted into an analog signal, and is transmitted in a data form appropriate for data transmission and reception via packet switching such as Wi-Fi, Bluetooth, ZigBee, or the like.

The home appliance 100 and the communication device 200 may transmit and receive the second voice data through the local area radio communication modules 183 and 283, respectively.

The home appliance 100 outputs a voice signal and receives a voice signal of a user. The voice signal is a signal in a sound wave form recognizable by the user U and is output through a speaker (not shown) included in the refrigerator 100-1. The refrigerator 100-1 may receive voice of the user U through a microphone (not shown).

Figure 15:
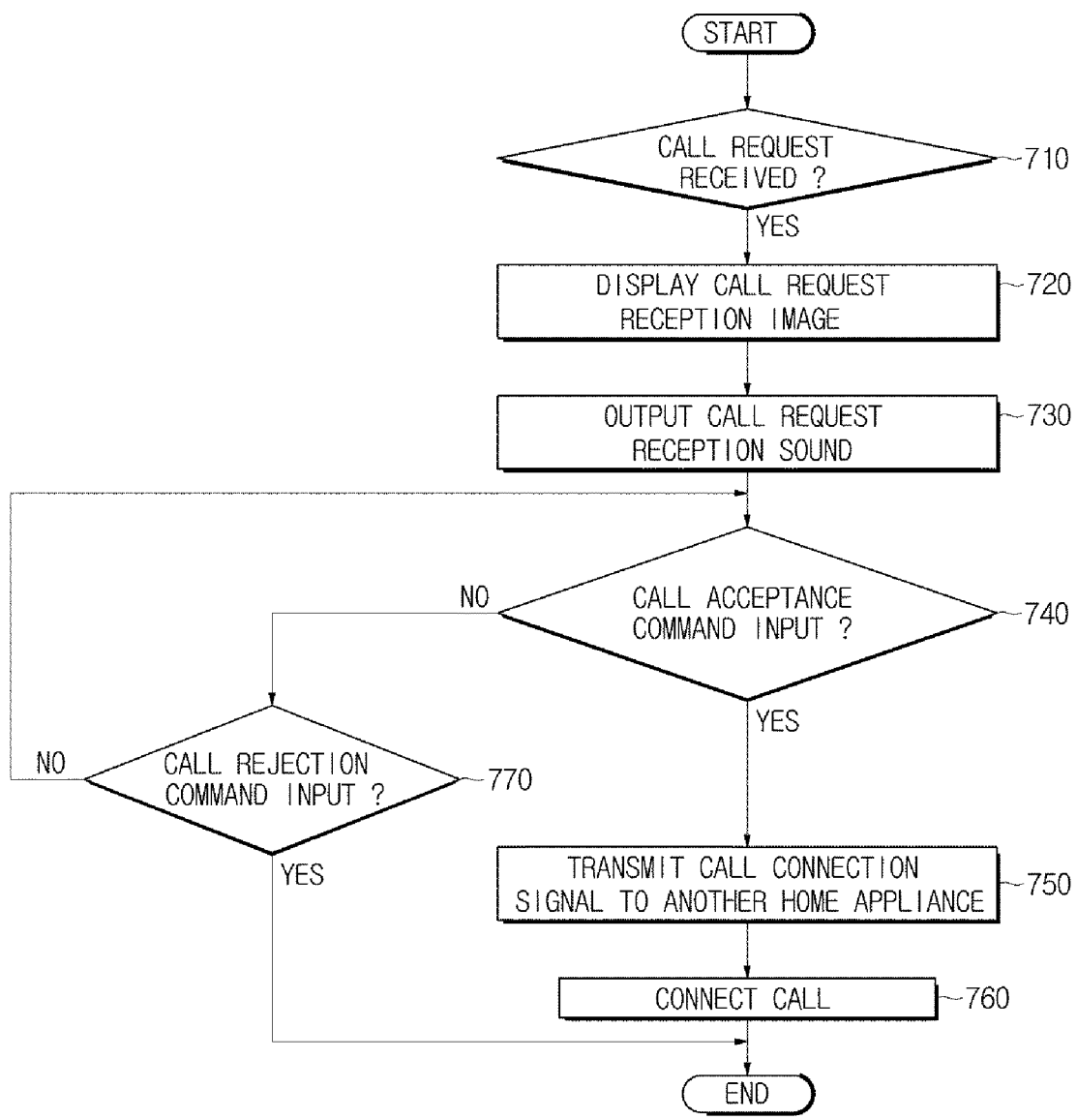
FIG. 15 is a flowchart illustrating a method of receiving a call request by a home appliance according to an embodiment of the present disclosure.
Figure 16:
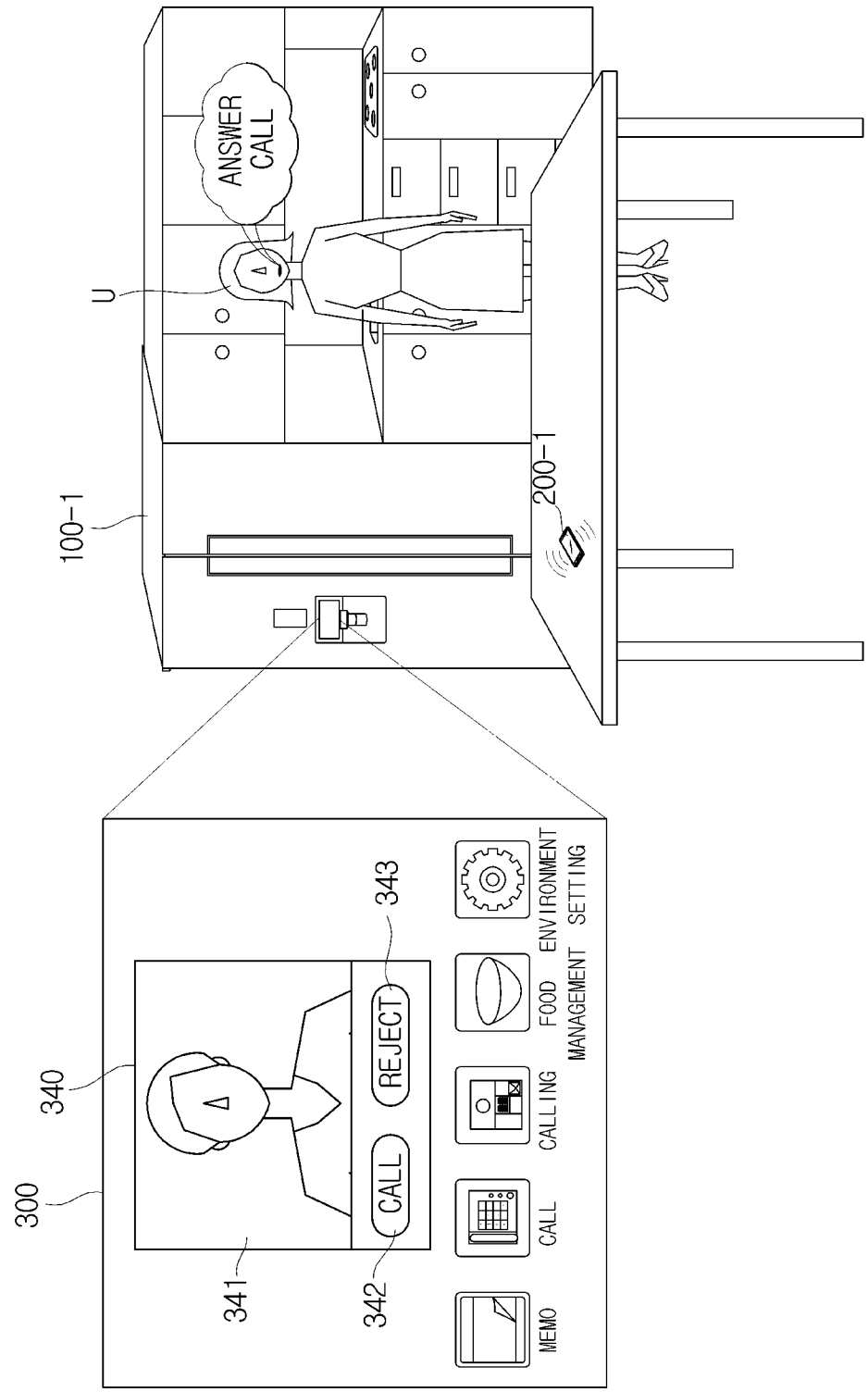
FIG. 16 is a diagram illustrating an example in which a home appliance receives a call request, according to an embodiment of the present disclosure.

FIG. 15 is a flowchart illustrating a method of receiving a call request by a home appliance according to an embodiment of the present disclosure. FIG. 16 is a diagram illustrating an example in which a home appliance receives a call request, according to an embodiment of the present disclosure.

Referring to FIGS. 15 and 16, the home appliance 100 determines whether a call request is received from the communication device 200 (710). In detail, when the call request is received from the external phone 1 (refer to FIG. 1), the communication device 200 transmits the call request to the home appliance 100. In other words, the communication device 200 transmits the call request and caller information to the home appliance 100.

The home appliance 100 that receives the call request displays a call request reception image 340 on the home appliance user interface 110 (refer to FIG. 2) (720). As illustrated in FIG. 10, the call request reception image 340 includes a caller information display region 341 to display caller information containing a picture, a name, telephone number, and the like of the caller, a call accepting region 342 to input a call acceptance command to accept a call request, and a call rejection region 343 to input a call rejection command to reject a call request.

The user may check the call request reception image 340 displayed on the home appliance user interface 110 (refer to FIG. 2) of the home appliance 100 and determine whether to accept or reject the call request.

In addition, the home appliance 100 outputs call request reception sound (e.g., bell sound) through a speaker (not shown) included in the home appliance sound output unit 160 (refer to FIG. 3) (730). The communication device 200 may also display a call request reception image on the communication device user interface 210 (refer to FIG. 4) and output call request reception sound through a speaker (not shown) included in the communication device sound output unit 260 (refer to FIG. 5).

In this case, after the home appliance 100 receives the call request and remains on standby for a predetermined standby time, the home appliance 100 may output a call request reception sound, in order to prevent a user from being confused when the home appliance 100 and the communication device 200 simultaneously output call request reception sound and to prevent the home appliance 100 from unnecessarily generating call request reception sound when the user receives a call request through the communication device 200.

Then, the home appliance 100 determines whether a call acceptance command is input by the user U (740). The home appliance 100 may receive the call acceptance command through the home appliance user interface 110 (refer to FIG. 2) and may also receive the call acceptance command through a speaker (not shown) included in the home appliance voice input unit 140 (refer to FIG. 2).

For example, as illustrated in FIG. 16, the user U may input the call acceptance command by touching the call accepting region 342 contained in the call request reception image 340 displayed on the refrigerator 100-1 or touching the call accepting region 342 and then dragging the accepting region 342. In addition, as illustrated in FIG. 16, upon checking call request reception when the user is away from the home appliance 100, the user U may input the call acceptance command to the refrigerator 100-1 through a voice signal such as "answer call" or "connect call".

In addition, when a proximity sensor is provided close to the home appliance user interface 110 (refer to FIG. 2) of the home appliance 100, the user U may perform a predetermined call acceptance operation such as an operation of gesture or moving a body part (e.g., a hand or the like) close to the home appliance user interface 110 (refer to FIG. 2) of the home appliance 100 to input the call acceptance command.

When the user U inputs the call acceptance command to the home appliance 100 (YES of 740), the home appliance 100 transmits a call connection signal to other home appliances (750). For example, when the call acceptance command is input through the refrigerator 100-1, the refrigerator 100-1 may transmit the call connection signal to at least one of other home appliances such as the air conditioner 100-2 (refer to FIG. 1) and the TV 100-3 (refer to FIG. 1) through the local area communication network 20 (refer to FIG. 1), and the at least one of other home appliances may temporarily stop an operation or may reduce a volume of sound that is currently output in order to prevent noise from being generated.

At least one of other home appliances may temporarily stop an operation or may reduce a volume of sound that is currently output to improve the quality of telephone call via the home appliance 100.

Then, the home appliance 100 connects a call (760). In detail, the home appliance 100 transmits a call acceptance command to the communication device 200. The communication device 200 that receives the call acceptance command transmits a call acceptance signal to a voice call service provider through the wide area communication service network 2 (refer to FIG. 1) to connect the call with the external phone 1 (refer to FIG. 1).

When the call is connected, the communication device 200 divides the voice data received from the external phone 1 (refer to FIG. 1) into packets with a predetermined size and transmits the packets to the home appliance 100, and the home appliance 100 converts the received voice data into a voice signal and outputs the voice signal, as described above. In addition, the home appliance 100 converts the voice signal received from the user U into voice data, divides the voice data into packets, and transmits the packets to the communication device 200, and the communication device 200 transmits the voice data to the external phone 1 (refer to FIG. 1).

When the user U does not input a call acceptance command (No of 740), the home appliance 100 determines whether a call rejection command is input (770). The call rejection command may be input through the home appliance user interface 110 (refer to FIG. 2) or the home appliance voice input unit 140 (refer to FIG. 2), like the call acceptance command.

When the user U inputs the call rejection command (YES of 770), the home appliance 100 transmits the call rejection command to the communication device 200, and the communication device 200 transmits a call rejection signal to a voice call service provider.

When the user U does not input a call rejection command (No of 770), the home appliance 100 re-determines whether the call acceptance command is input.

Figure 17:
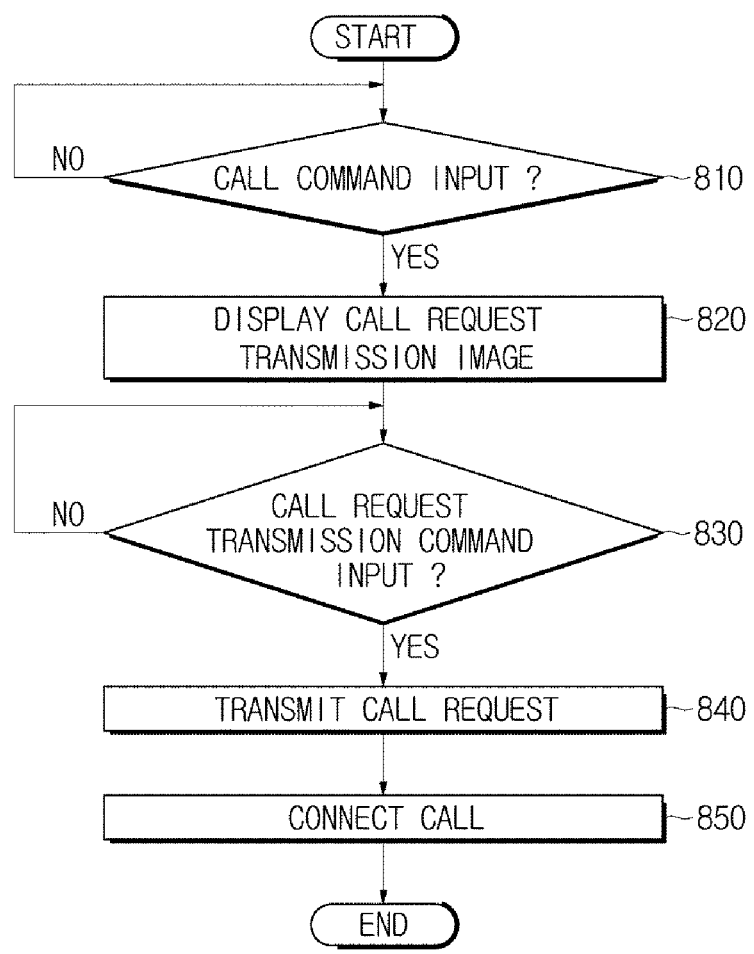
FIG. 17 is a flowchart illustrating a method of transmitting a call request by a home appliance according to an embodiment of the present disclosure.
Figure 18:
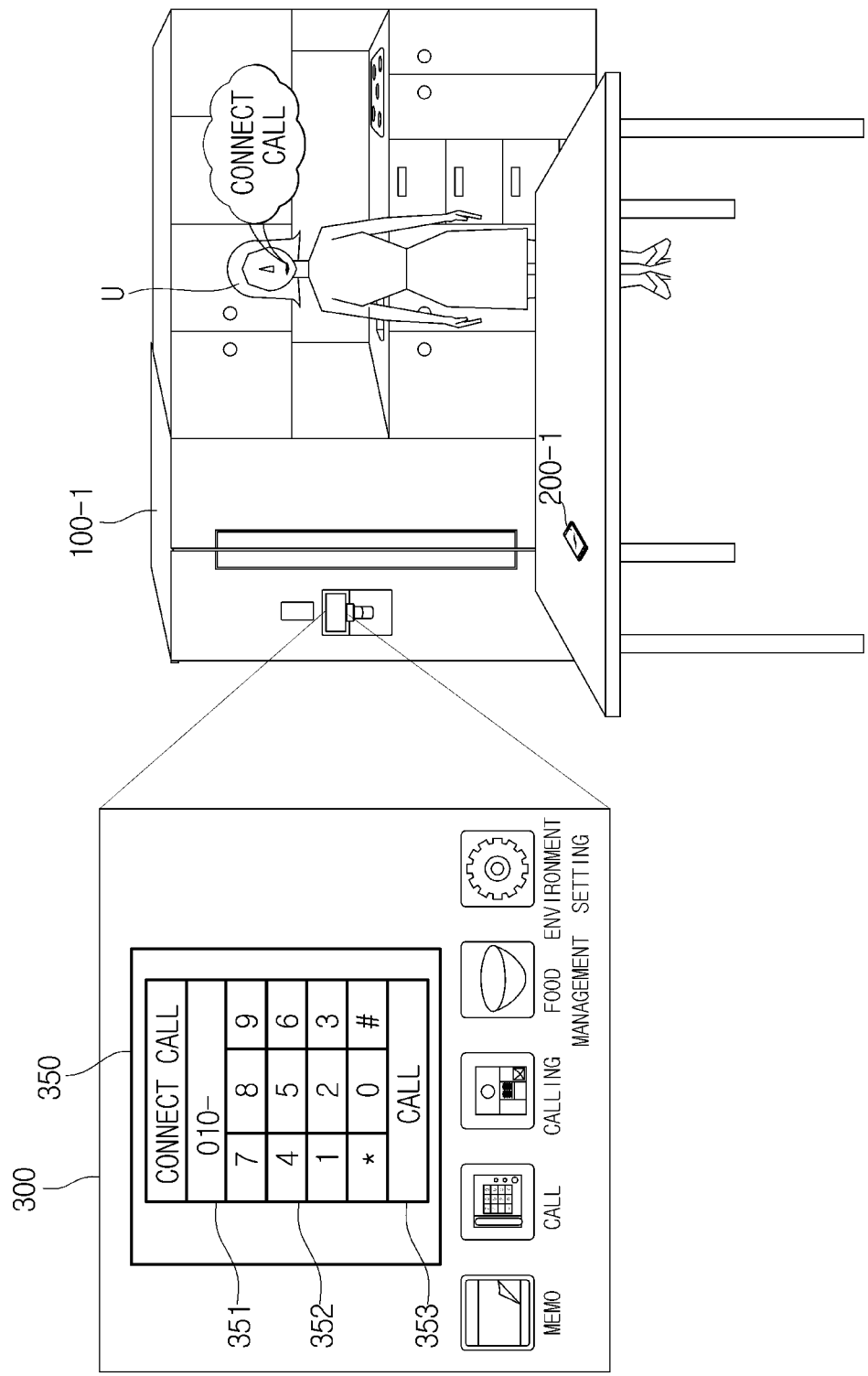
FIG. 18 is a diagram illustrating an example in which a home appliance transmits a call request, according to an embodiment of the present disclosure.

FIG. 17 is a flowchart illustrating a method of transmitting a call request by a home appliance according to an embodiment of the present disclosure. FIG. 18 is a diagram illustrating an example in which a home appliance transmits a call request, according to an embodiment of the present disclosure.

Referring to FIGS. 17 and 18, the home appliance 100 determines whether a user inputs a call command (810). The user U may input the call command through the home appliance user interface 110 (refer to FIG. 2) of the home appliance 100 or input the call command through voice such as "make call" or the like.

When the call command is input (YES of 810), the home appliance 100 displays a call request transmission image 350 on the home appliance user interface 110 (refer to FIG. 2) (820). For example, as illustrated in FIG. 18, the call request transmission image 350 includes a keypad region 351 to input contact information such as a telephone number of a receiver, a receiver information display region 352 to display a telephone number or name input by the user U, and a call request transmission region 353 to input a call request transmission command.

The user U may input contact information such as a telephone number of a receiver through the call request transmission image 350 displayed on the home appliance user interface 110 (refer to FIG. 2) of the home appliance 100 or input the contact information of the receiver through voice.

Then, the home appliance 100 determines whether a call request transmission command is input (830). The user may touch the call request transmission region 353 of the call request transmission image 350 displayed on the home appliance 100 to input the call request transmission command or may input the call request transmission command through voice.

When the call request transmission command is input (YES of 830), the home appliance 100 transmits a call request to the communication device 200 (840). For example, the refrigerator 100-1 may transmit an identification information such as a MAC address, an IP address, and the like of the refrigerator 100-1 together with a telephone number, a name, and the like of an opposite party.

The communication device 200 that receives the call request transmits a call request signal to a voice call service provider based on the receiver information, and connects the call through the home appliance 100 when the receiver accepts the call (850).

When the call is connected, the communication device 200 divides the voice data received from the external phone 1 (refer to FIG. 1) into packets with a predetermined size and transmits the packets to the home appliance 100, and the home appliance 100 converts the received voice data into a voice signal and outputs the voice signal, as described above. In addition, the home appliance 100 converts the voice signal received from the user U into voice data, divides the voice data into packets, and transmits the packets to the communication device 200, and the communication device 200 transmits the voice data to the external phone 1 (refer to FIG. 1).

The home appliance 100 may transmit an emergency call request provided by the communication device 200 as well as a normal call request.

Figure 19:
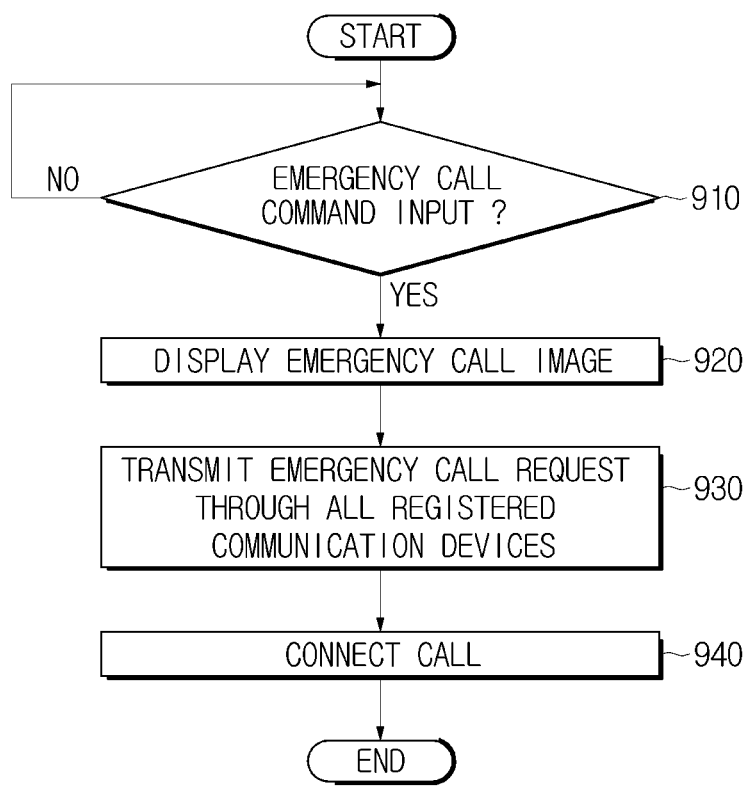
FIG. 19 is a flowchart illustrating a method of transmitting an emergency call request by a home appliance according to an embodiment of the present disclosure.

FIG. 19 is a flowchart illustrating a method of transmitting an emergency call request by a home appliance according to an embodiment of the present disclosure.

Referring to FIG. 19, the home appliance 100 determines whether a user inputs an emergency call command (910). The user U may input the emergency call command through the home appliance user interface 110 (refer to FIG. 2) of the home appliance 100 or input the emergency call command through voice such as "emergency call" or the like. In addition, a proximity sensor may be provided at a predetermined portion of the home appliance 100 and the user U may use gesture or move a body part such as a hand or the like close to the corresponding portion so as to input the emergency call command or may perform a predetermined pattern operation so as to input the emergency call command.

For example, with regard to the refrigerator 100-1, the emergency call command may be input via an operation of opening and closing a door of the refrigerator 100-1 several times or touching a lower portion of a front surface of the refrigerator 100-1 by a body part.

When the emergency call command is input (YES of 910), the home appliance 100 displays an emergency call image (920) and transmits the emergency call request through all the communication devices 200 connected to the home appliance 100 (930).

For example, as illustrated in FIG. 7, when the mobile phone 200-1, the Internet telephone 200-2, and the tablet PC 1 200-3 are connected to the home appliance 100, the emergency call request is transmitted to the mobile phone 200-1, the Internet telephone 200-2, and the tablet PC 1 200-3.

In this case, when the receiver of the emergency call request has contact number selected by the user U, the receiver transmits the emergency call request to the determined contact number. Otherwise, the receiver of the emergency call request may transmit an emergency call request to an emergency service provided by a country or a public organization.

Accordingly, with regard to the emergency call request, the emergency call request is transmitted to the pre-stored contact number without input of the contact number unlike the normal call request illustrated in FIGS. 17 and 18.

Figure 20:
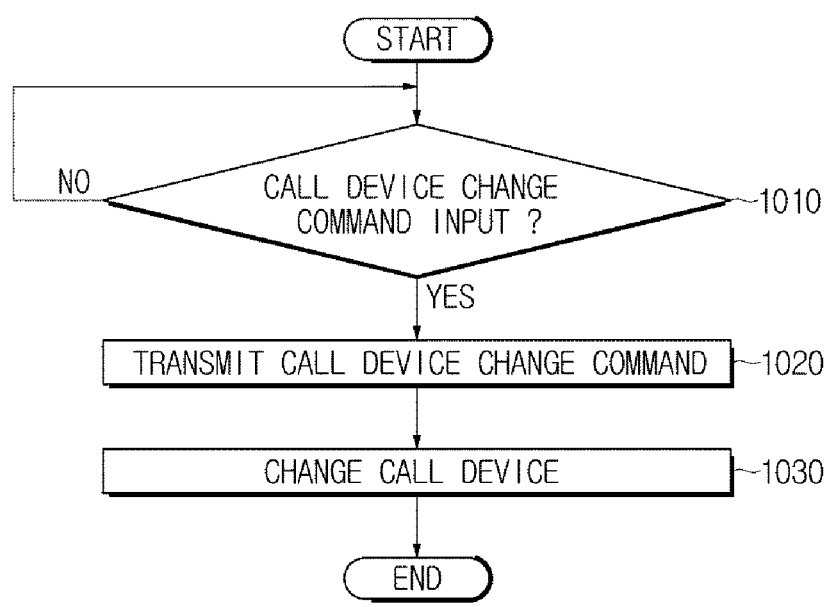
FIG. 20 is a flowchart illustrating a method of changing a device for performing a call function by a voice communication system according to an embodiment of the present disclosure.
Figure 21:
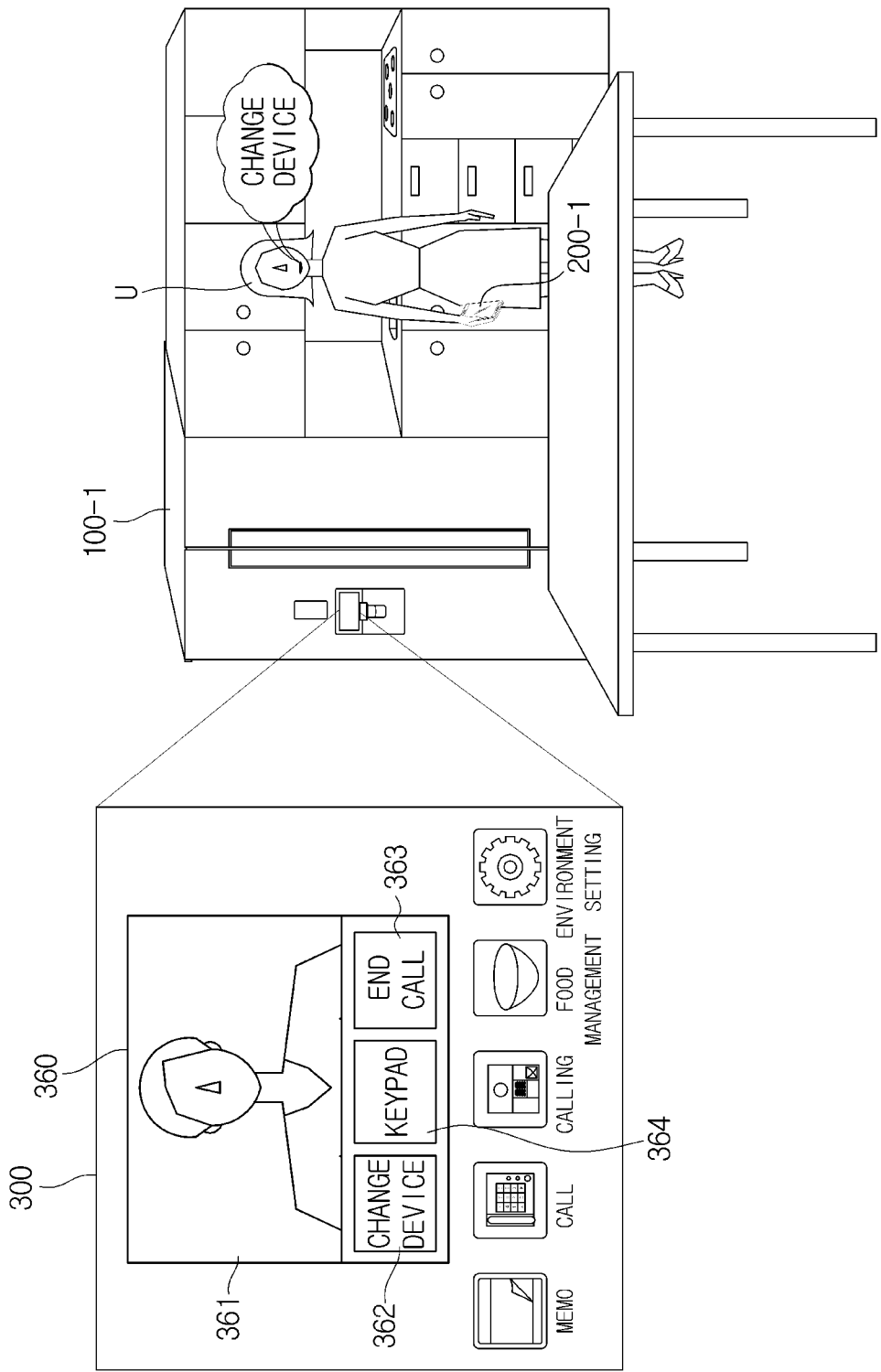
FIG. 21 is a diagram illustrating an example of a call image displayed on a home appliance according to an embodiment of the present disclosure.
Figure 22:
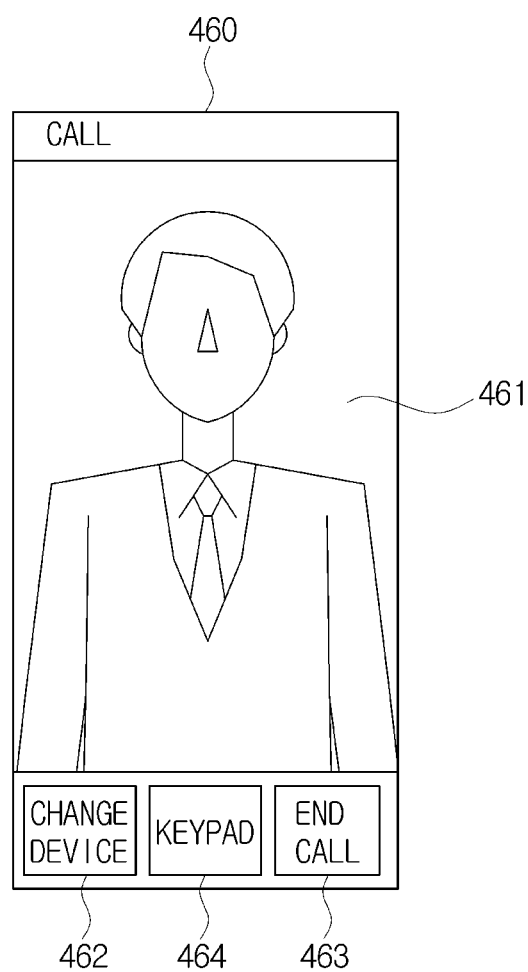
FIG. 22 is a diagram illustrating an example of a call image displayed on a communication device according to an embodiment of the present disclosure.

FIG. 20 is a flowchart illustrating a method of changing a device to perform a call function by a voice communication system according to an embodiment of the present disclosure. FIG. 21 is a diagram illustrating an example of a call image displayed on a home appliance according to an embodiment of the present disclosure. FIG. 22 is a diagram illustrating an example of a call image displayed on a communication device according to an embodiment of the present disclosure.

Referring to FIGS. 20 to 22, the home appliance 100 or the communication device 200 determines whether the user U inputs a call device change command during the call (1010).

For example, the home appliance 100 may display a call image 360 on the home appliance user interface 110 (refer to FIG. 2) during the call, as illustrated in FIG. 21. The call image 360 of the home appliance 100 includes an opposite party information display region 361 to display opposite party information containing a picture, a name, telephone number, and the like of the opposite party, a call device changing region 362 to input the call device change command to change a call device to the communication device 200 during the call, a call ending region 363 to input a call ending command to end the call during the call, and a keypad display region 364 to input a character or number during the call.

While making a call through the home appliance 100, the user U may touch the call device changing region 362 of the home appliance 100 to input the call device change command to change the device to perform the call to the communication device 200.

In addition, the communication device 200 may display a call image 460 on the communication device user interface 210 (refer to FIG. 4) during the call, as illustrated in FIG. 22. The call image 460 of the communication device 200 includes an opposite party information display region 461, a call device changing region 462, a call ending region 463, and a keypad display region 464.

While making a call through the communication device 200, the user U may touch the call device changing region 462 of the communication device 200 to input the call device change command to change the device to perform the call to the home appliance 100.

When the call device change command is input during the call (YES of 1010), the home appliance 100 or the communication device 200 transmits the call device change command (1020). The home appliance 100 transmits the call device change command to the communication device 200 and the communication device 200 transmits the call device change command to the home appliance 100.

Then, the call device is changed (1030).

For example, when the user U is making a call through the home appliance 100, the current call device is changed to the communication device 200 from the home appliance 100. In detail, communication between the home appliance 100 and the communication device 200 is stopped, the communication device 200 converts the voice data received from the external phone 1 (refer to FIG. 1) into a voice signal and outputs the voice signal, and converts the voice signal received from the user U into voice data and transmits the voice data to the external phone 1 (refer to FIG. 1).

In addition, when the user U is making a call through the communication device 200, the current call device is changed to the home appliance 100 from the communication device 200. In detail, communication between the home appliance 100 and the communication device 200 is initiated, the communication device 200 transmits the voice data received from the external phone 1 (refer to FIG. 1) to the home appliance 100, and the home appliance 100 converts the received voice data into a voice signal and outputs the voice signal. In addition, the home appliance 100 converts the voice signal received from the user U into voice data and transmits the voice data to the communication device 200, and the communication device 200 transmits the received data to the external phone 1 (refer to FIG. 1).

The user may input a dial tone during the call through the home appliance 100. For example, while making a call to an automatic response system (ARS) through the home appliance 100, the user may input the dial tone in order to input information to the ARS.

In this case, the user touches the keypad display region 364 included in the call image 360 of the home appliance 100 illustrated in FIG. 21 so as to display a keypad (not shown) for a dial. When the user touches the keypad (not shown), corresponding dial information may be transmitted to the communication device 200, and the communication device 200 may generate a dial tone corresponding to the received dial information and transmit the dial tone to the external phone 1 (refer to FIG. 1).

Figure 23:
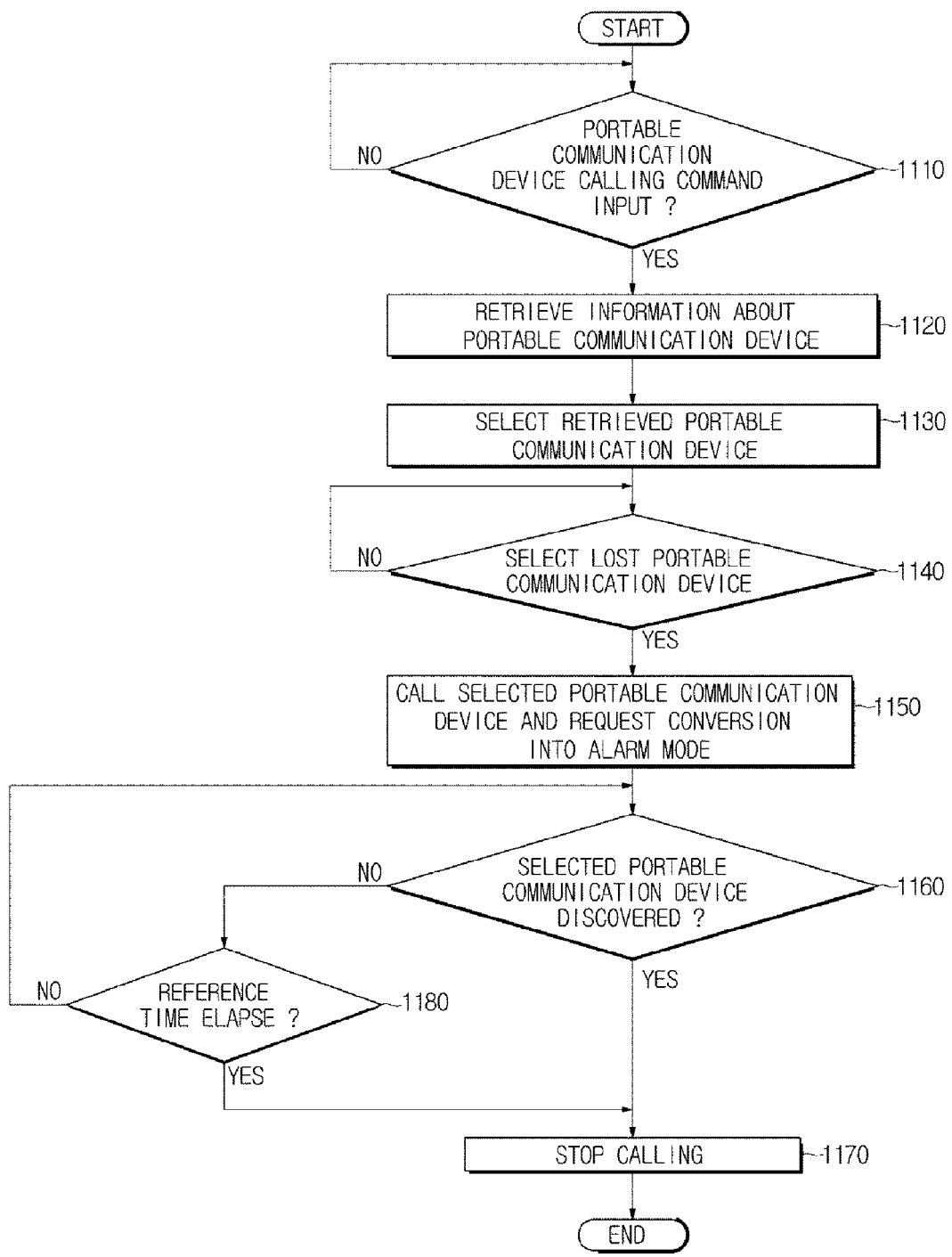
FIG. 23 is a flowchart illustrating a method of calling a communication device by a refrigerator according to an embodiment of the present disclosure.
Figure 24:
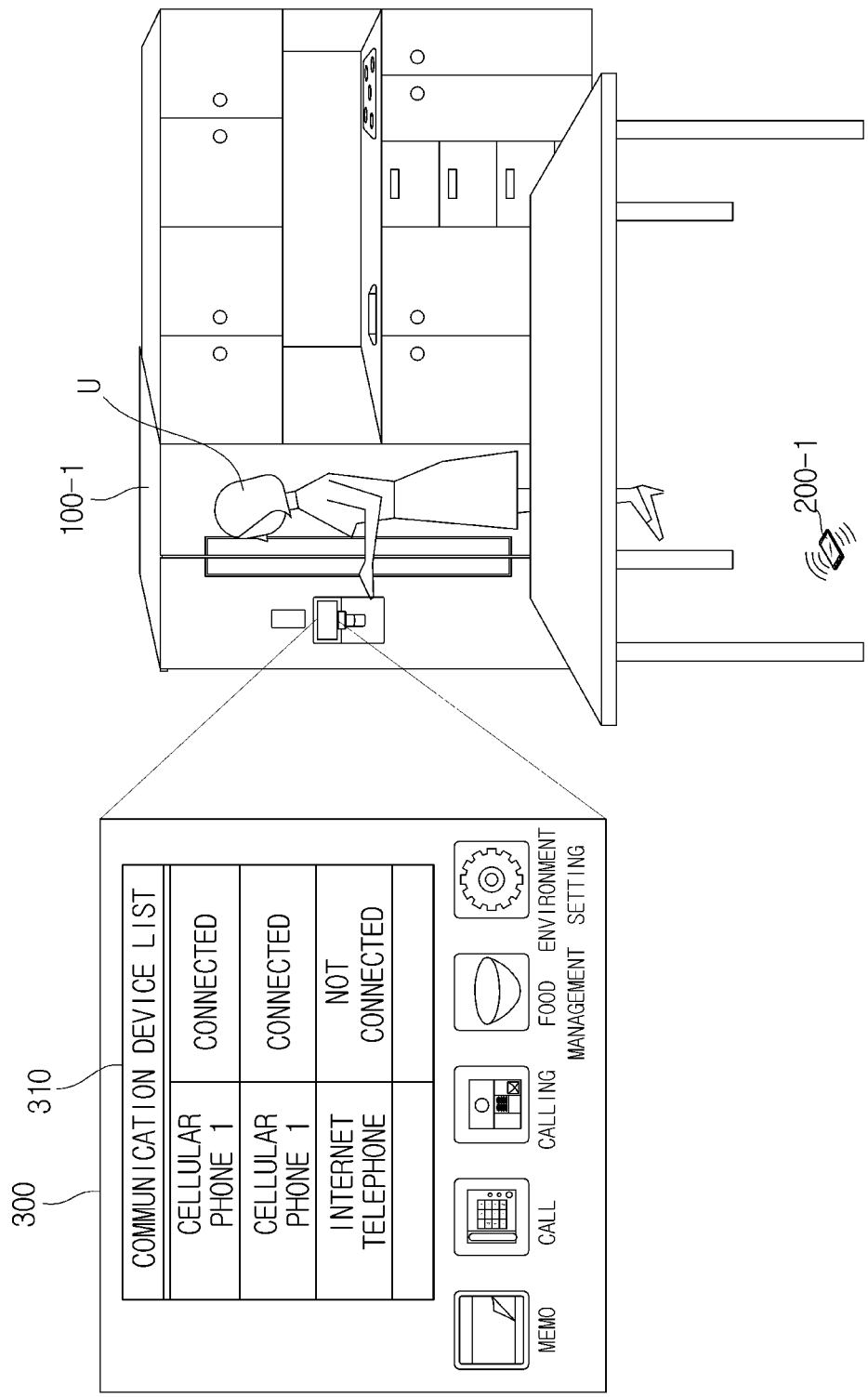
FIG. 24 is a diagram illustrating an example in which a refrigerator calls a communication device according to an embodiment of the present disclosure

FIG. 23 is a flowchart illustrating a method of calling a communication device by a home appliance such as a refrigerator according to an embodiment of the present disclosure. FIG. 24 is a diagram illustrating an example in which a home appliance such as a refrigerator calls a communication device according to an embodiment of the present disclosure.

Referring to FIGS. 23 and 24, the home appliance 100 determines whether the user inputs a call device calling command to call the communication device 200 (1110). When the user does not know a location of the communication device 200, the user may input the call device calling command to the home appliance 100.

When the call device calling command is input (YES of 1110), the home appliance 100 retrieves information about the communication devices 200 (1120). For example, as illustrated in FIG. 24, the refrigerator 100-1 may retrieve information about the mobile phone 200-1 that accesses the local area communication network 20 (refer to FIG. 1).

Then, the home appliance 100 displays a list of retrieved information about communication devices 200 (1130).

Then, the home appliance 100 receives selection of a lost communication device 200 from the user (1140).

When the lost communication device 200 is selected (YES of 1140), the home appliance 100 calls the selected communication device 200 and requests conversion into an alarm mode (1150). For example, as illustrated in FIG. 24, the refrigerator 100-1 requests output of a bell sound to the mobile phone 200-1 through the local area communication network 20 (refer to FIG. 1). In this case, the refrigerator 100-1 may simultaneously request conversion into a bell sound mode when the mobile phone 200-1 is in a vibration or mute mode.

Then, the home appliance 100 determines whether the selected communication device 200 is discovered (1160). For example, when the mobile phone 200-1 that receives the request for output of bell sound from the refrigerator 100-1 outputs the bell sound, the user U may recognize a location of the mobile phone 200-1 through the bell sound of the mobile phone 200-1. When the user U that discovers the mobile phone 200-1 manipulates the mobile phone 200-1, the mobile phone 200-1 transmits a discovery message to the refrigerator 100-1.

Upon determining that the communication device 200 is discovered (YES of 1160), the home appliance 100 stops calling the communication device 200 (1170).

Upon determining that the communication device 200 is not discovered (No of 1160), the home appliance 100 determines whether time to call the communication device 200 exceeds predetermined reference time (1180). Here, the reference time may be determined by the user U as sufficient time to discover the communication device 200 through the bell sound.

When the reference time elapses (YES of 1180), the home appliance 100 stops calling the communication device 200 (1170). When the reference time does not elapse (No of 1180), the home appliance 100 continues to call the selected communication device 200.

When the communication device 200 is lost and is called using reference time connected to the local area communication network 20 (refer to FIG. 1), even if the communication device 200 operates in a vibration or mute mode, the communication device 200 is switched to a bell sound mode so as to output a bell sound, thereby easily recognizing a location of the communication device 200.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A control method of a home appliance, the method comprising:
    retrieving information about a communication device;
    authenticating the communication device using the information;
    registering the authenticated communication device;
    receiving identification information of a receiver that receives a call request when the user inputs the call request;
    making a call to the receiver through the communication device in response to receiving the identification information of the receiver;
    receiving a first voice data from the authenticated communication device, the first voice data being received from another communication device through the communication device;
    outputting a first voice signal corresponding to the first voice data to a user;
    receiving a second voice signal from the user; and
    transmitting a second voice data corresponding to the second voice signal to the communication device, the second voice data being transmitted to the another communication device through the communication device.

2. The method according to claim 1, further comprising ending communication with the communication device when a call device change command is input by the user.

3. The method according to claim 1, wherein the retrieving comprises:
    transmitting a retrieval signal to the communication device through a local area communication network; and
    receiving a response signal and the information including identification information of the communication device.

4. The method according to claim 1, wherein the authenticating comprises:

generating an authentication code to authenticate the communication device;

transmitting the authentication code to the communication device;

receiving a code corresponding to the authentication code from the user; and authenticating the communication device according to a comparison result between the received code and the authentication code.

5. The method according to claim 1, wherein the authenticating comprises:

receiving identification information from the communication device when the communication device is docked; and authenticating the communication device transmitting the identification information.

6. The method according to claim 1, wherein the authenticating comprises:

authenticating the communication device transmitting identification information of the retrieved communication device when the identification information is input via near field communication.

7. The method according to claim 1, wherein the registering comprises storing an identification code of the authenticated communication device.

8. The method according to claim 1, further comprising displaying identification information of a caller that transmits a call request when the call request is received from the communication device.

9. The method according to claim 8, wherein the identification information of the caller comprises at least one of a name, a picture, and a telephone number of the caller.

10. The method according to claim 1, wherein the identification information of the receiver comprises at least one of a name and a telephone number of the receiver.

11. The method according to claim 1, further comprising:

transmitting a calling signal to the communication device when the user inputs a calling command for the registered communication device; and stopping transmitting the calling signal when a response signal to the calling signal is received.

12. The method according to claim 1, further comprising:

transmitting a calling signal to the communication device when the user inputs a calling command.

13. The method according to claim 12, further comprising:

determining whether the calling command is an emergency call command; and when it is determined that the calling command is the emergency call command, transmitting an emergency call request.

14. The method according to claim 13, wherein the emergency call command includes a predetermined a gesture by the user or a predetermined movement of the user.

15. A home appliance comprising:

a voice input unit configured to receive a voice signal of a user;

a sound output unit configured to output sound;

a communication unit configured to transmit and receive voice data to and from a communication device; and a controller configured to control the sound output unit to output a sound signal corresponding to a first voice data received from the communication device the first voice data being received from another communication device through the communication device, and control the communication unit to transmit a second voice data corresponding to the voice signal of the user, the second voice data being transmitted to the another communication device through the communication device, wherein the controller is configured to receive identification information of a receiver that receives a call request when the user inputs the call request and make a call to the receiver through the communication device in response to receiving the identification information of the receiver.

16. The home appliance according to claim 15, wherein the controller transmits a retrieval signal to the communication device in order to retrieve the communication device and receives a response signal and identification information of the communication device.

17. The home appliance according to claim 15, wherein the communication unit comprises a wired communication module to wired-communicate with the communication device, a local area radio communication module to perform local area radio communication with the communication device, and a near field communication module to perform near field communication with the communication device.

18. The home appliance according to claim 17, wherein the controller transmits, through the local area radio communication module, an authentication code to the communication device and authenticates the communication device according to a comparison result between a code input by the user and the authentication code.

19. The home appliance according to claim 17, wherein the controller receives, through the wired communication module, identification information from the communication device when the communication device is docked and authenticates the docked communication device.

20. The home appliance according to claim 17, wherein the controller authenticates the communication device transmitting identification information upon receiving the identification information through the near field communication module.

21. The home appliance according to claim 15, further comprising a storage unit to store a program and data, wherein the controller stores identification information of the communication device in the storage unit.

22. The home appliance according to claim 15, wherein the controller controls the communication unit to transmit a calling signal to the communication device when the user inputs a calling command.

23. The home appliance according to claim 22, wherein the controller determines whether the calling command is an emergency call command, and when it is determined that the calling command is the emergency call command, the controller controls the communication unit to transmit an emergency call request.

24. The home appliance according to claim 23, wherein the emergency call command includes a predetermined gesture by the user or a predetermined movement of the user.

* * * * *